US012000544B2

(12) United States Patent
Feit

(10) Patent No.: US 12,000,544 B2
(45) **Date of Patent: *Jun. 4, 2024**

(54) OMNIDIRECTIONAL LIGHT EMITTING DIODE FILAMENT HOLDER

(71) Applicant: Feit Electric Company, Inc., Pico Rivera, CA (US)

(72) Inventor: Alan Barry Feit, Encino, CA (US)

(73) Assignee: FEIT ELECTRIC COMPANY, INC., Pico Rivera, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/062,155

(22) Filed: Dec. 6, 2022

(65) Prior Publication Data

US 2023/0100614 A1 Mar. 30, 2023

Related U.S. Application Data

(63) Continuation of application No. 17/471,969, filed on Sep. 10, 2021, now Pat. No. 11,543,084, which is a
(Continued)

(51) Int. Cl.
*F21K 9/232* (2016.01)
*F21V 23/06* (2006.01)
(Continued)

(52) U.S. Cl.
CPC .............. *F21K 9/232* (2016.08); *F21V 23/06* (2013.01); *H05B 45/30* (2020.01); *F21K 9/235* (2016.08);
(Continued)

(58) Field of Classification Search
CPC ......... F21K 9/232; F21K 9/235; H05B 45/00; H05B 45/30; F21V 23/06; F21V 3/02;
(Continued)

(56) References Cited

U.S. PATENT DOCUMENTS 1,457,239 A 5/1923 Volpian
1,552,835 A 9/1925 Foulk
(Continued)

FOREIGN PATENT DOCUMENTS

CN 107270148 A 10/2017
CN 107504378 A 12/2017
(Continued)

OTHER PUBLICATIONS

Canadian Intellectual Property Office, Office Action for Application No. 3,013,021, dated Apr. 6, 2020, (6 pages), Canadian Intellectual Property Office, Quebec, Canada.
(Continued)

*Primary Examiner* — Kevin Quarterman
(74) *Attorney, Agent, or Firm* — Alston & Bird LLP

(57) ABSTRACT

An omnidirectional LED filament holder and lighting device comprising the same comprises a filament tree supporting a plurality of linear LED filaments having a twisted orientation relative to a central support stalk of the filament tree. When arranged within a globe of a lighting device, the omnidirectional LED filament holder provides a lighting device providing omnidirectional light emission usable for general lighting applications while providing a desirable aesthetic for the lighting device.

20 Claims, 26 Drawing Sheets

Related U.S. Application Data continuation of application No. 16/904,326, filed on Jun. 17, 2020, now Pat. No. 11,143,363, which is a continuation of application No. 15/901,602, filed on Feb. 21, 2018, now Pat. No. 10,724,690, which is a continuation-in-part of application No. 29/520,892, filed on Mar. 18, 2015, now Pat. No. Des. 818,153.

(51) Int. Cl.

| | |
|---|---|
| ***H05B 45/30*** | (2020.01) |
| *F21K 9/235* | (2016.01) |
| *F21V 3/02* | (2006.01) |
| *F21W 121/00* | (2006.01) |
| *F21Y 107/00* | (2016.01) |
| *F21Y 115/10* | (2016.01) |

(52) U.S. Cl.

CPC ............ *F21V 3/02* (2013.01); *F21W 2121/00* (2013.01); *F21Y 2107/00* (2016.08); *F21Y 2115/10* (2016.08)

(58) Field of Classification Search

CPC ............. F21Y 2107/00; F21Y 2115/10; F21W 2121/00

See application file for complete search history.

(56) References Cited

U.S. PATENT DOCUMENTS

| | | | | |
|---|---|---|---|---|
| 1,957,242 | A | 5/1934 | Berger | |
| 1,961,509 | A | 6/1934 | Ruben | |
| 1,981,878 | A | 11/1934 | Ruben | |
| 6,774,546 | B2 | 8/2004 | Gibboney, Jr. | |
| 8,796,910 | B2 | 8/2014 | Jung et al. | |
| 8,890,401 | B2 | 11/2014 | Bailey | |
| 9,732,913 | B2 | 8/2017 | Weekamp | |
| D818,153 | S | 5/2018 | Feit | |
| 10,724,690 | B2 * | 7/2020 | Feit | H05B 45/30 |
| 11,143,363 | B2 * | 10/2021 | Feit | F21V 23/06 |
| 11,543,084 | B2 | 1/2023 | Feit | |
| 2013/0285547 | A1 | 10/2013 | Janik et al. | |
| 2015/0085489 | A1 | 3/2015 | Anderson | |
| 2017/0167663 | A1 | 6/2017 | Hsiao et al. | |
| 2018/0172218 | A1 | 6/2018 | Feit | |
| 2020/0318798 | A1 | 10/2020 | Feit | |
| 2021/0404607 | A1 | 12/2021 | Feit | |

FOREIGN PATENT DOCUMENTS

| | | | |
|---|---|---|---|
| WO | WO 2013/099074 | A1 | 7/2013 |
| WO | WO 2015/081804 | A1 | 6/2015 |
| WO | WO 2015/096280 | A1 | 7/2015 |

OTHER PUBLICATIONS

Canadian Intellectual Property Office, Canadian Office Action for Canadian Application No. 3,013,021, dated May 13, 2019, (7 pages), Canadian Intellectual Property Office, Quebec, Canada.

U.S. Appl. No. 17/471,969, filed Sep. 10, 2021, U.S. Pat. No. 11,543,084.

U.S. Appl. No. 16/904,326, filed Jun. 17, 2020, U.S. Pat. No. 11,143,363.

U.S. Appl. No. 15/901,602, filed Feb. 21, 2018, U.S. Pat. No. 10,724,690.

U.S. Appl. No. 29/520,892, filed Mar. 18, 2015, D818,153.

* cited by examiner

OMNIDIRECTIONAL LIGHT EMITTING DIODE FILAMENT HOLDER

CROSS-REFERENCE TO RELATED APPLICATIONS

This patent application is a continuation of U.S. application Ser. No. 17/471,969 filed Sep. 10, 2021, which is a continuation of U.S. application Ser. No. 16/904,326 filed Jun. 17, 2020 now U.S. Pat. No. 11,143,363, which application is itself also a continuation of U.S. application Ser. No. 15/901,602 filed Feb. 21, 2018 (now also U.S. Pat. No. 10,724,690), which application is itself also a continuation-in-part of U.S. application Ser. No. 29/520,892 filed Mar. 18, 2015 (now also U.S. Pat. No. D818,153); the contents of all of which as are incorporated herein by reference in their entireties.

BACKGROUND

Decorative light bulbs having elongated and coiled filaments (sometimes referred to as "Edison"-style lightbulbs) have been used as accent lighting and/or as primary sources of light in dimly-lit atmospheres. Incandescent versions of these decorative light bulbs were widely recognized as being inefficient light sources that emitted low-levels of light and were prone to early burn-out due at least in part to the length of the elongated filament. However, these noted inefficiencies were balanced by the bulbs' unique and sometimes desirable aesthetic properties of the glowing, elongated filament within the bulb globe.

Recently, Light Emitting Diode (LED) filament decorative light bulbs have been created that have a higher power efficiency than prior incandescent bulbs while mimicking the same desirable aesthetic properties of these decorative light bulbs. Although the LED bulbs are not subject to the same material-specific brightness limitations as incandescent-style bulbs, many of these decorative LED bulbs are still created to emit relatively low levels of light to enable users to appreciate the intricacies of the glowing elongated filament within the bulb globe.

However, the intricate patterning of the elongated filament has historically prevented omnidirectional light emission from these decorative bulbs, regardless of whether the bulbs utilize incandescent or LED-based filaments for light emission. The decorative and intricate patterning of the filaments themselves require substantial support structures within the bulb, and those support structures block portions of the light emitted from the filaments, thereby preventing the formation of a fully omnidirectional bulb having desirable aesthetic qualities. Accordingly, a need exists for omnidirectional decorative LED light bulbs and methods of manufacturing the same.

BRIEF SUMMARY

Providing a decorative LED light bulb including a plurality of LED filaments arranged in a twisted orientation within a globe provides omnidirectional light emission from the bulb. The LED filaments may each be at least substantially linear LED filaments secured at an upper and lower end relative to a support stalk within the globe. The linear LED filaments may be provided in a twisted arrangement around the perimeter of the support stalk, such that the LED filaments are orientated at angle (between perpendicular and parallel) relative to the length of the support stalk. These LED filaments may have a 360 degree light emission angle about the longitudinal axis of the LED filaments, and thereby providing the LED filaments at an angle within the bulb provides light emitted vertically upward and laterally outward from the bulb, to provide an omnidirectional light emission from the bulb.

Various embodiments are directed to a decorative Light Emitting Diode (LED) bulb providing omnidirectional light output. In certain embodiments, the bulb comprises: a globe having an open bottom end; an electrical connector base secured over the open bottom end of the globe, wherein the electrical connector base houses an LED driver circuit, and the electrical connector base is configured to be secured within an electrical socket to transmit current to the LED driver circuit; and a filament tree extending from the electrical connector base and comprising a plurality of linear LED filaments electrically connected with the LED driver circuit and having a twisted arrangement around a support stalk.

Moreover, the filament tree may have a diameter smaller than a diameter of the open bottom end of the globe. In certain embodiments, each of the linear LED filaments emit light in 360 degrees around the circumference of the LED filament. The support stalk of certain embodiments is embodied as a clear rod extending away from a support base of the filament tree, wherein the support base is rigidly secured to the electrical connector base.

The filament tree may further comprise lower conductor branches electrically connecting a bottom end of the linear LED filaments with the LED driver circuit; and upper conductor branches electrically connecting a top end of the linear LED filaments relative to one another. In certain embodiments, the plurality of linear LED filaments comprises: a first grouping of linear LED filaments electrically connected via lower conductor branches and upper conductor branches in parallel; and a second grouping of linear LED filaments electrically connected via lower conductor branches and upper conductor branches in parallel; and wherein the first grouping of linear LED filaments is electrically connected in series with the second grouping of linear LED filaments via a portion of the upper conductor branches. In certain embodiments, the lower conductor branches comprise a plurality of semiannular conductor hubs each having a plurality of lower arms extending therefrom, wherein the bottom end of each of the linear LED filaments are electrically connected with a corresponding lower arm of the plurality of lower arms and wherein the semiannular conductor hubs are electrically insulated from one another and each of the semiannular conductor hubs are in electrical connection with the LED driver circuit; and the upper conductor branches comprise an annular conductor hub having a plurality of upper arms extending therefrom, wherein the upper end of each of the linear LED filaments are electrically connected with a corresponding upper arm of the plurality of upper arms. Moreover, the lower conductor branches and the upper conductor branches may have an overall diameter smaller than a diameter of the open bottom end of the globe. The lower conductor branches may be rigidly secured relative to a lower end of the support stalk and the upper conductor branches are rigidly secured relative to an upper end of the support stalk.

In certain embodiments, a lower end of a first linear LED filament of the plurality of linear LED filaments is at least substantially vertically aligned with an upper end of a second linear LED filament of the plurality of linear LED filaments. Moreover, the plurality of linear LED filaments may further comprise a third linear LED filament positioned between the first linear LED filament and the second linear LED filament. In certain embodiments, the plurality of linear LED filaments comprise at least 4 linear LED filaments.

Various embodiments are directed to a decorative Light Emitting Diode (LED) bulb providing omnidirectional light output. In certain embodiments, the bulb comprises: a sealed housing comprising a globe and an electrical connector; and a filament tree positioned within the sealed housing and comprising: a support stalk defining an upper end and a lower portion; and a plurality of LED filaments each defining a central portion positioned between opposing ends, wherein the opposing ends of each of the LED filaments are spaced a distance away from the support stalk and the central portion of each of the LED filaments is closer to the support stalk than the opposing ends of the LED filaments.

In various embodiments, each of the plurality of LED filaments are linear LED filaments. Moreover, the opposing ends of each of the filaments may define a lower end and an upper end, and wherein the lower end and the upper end may be spaced laterally from the support stalk by at least about an equal distance. In certain embodiments, the filament tree further comprises: lower conductor branches electrically connecting the lower end of each of the LED filaments with the electrical connector; and upper conductor branches electrically connecting the upper end of each of the LED filaments relative to one another.

Moreover, the globe may define an open bottom end and the electrical connector is sealed over the open bottom end, and wherein the filament tree has a diameter smaller than a diameter of the open bottom end of the globe. In certain embodiments, the support stalk is embodied as a clear rod extending away from a support base of the filament tree, wherein the support base is rigidly secured to the electrical connector. In various embodiments, a lower end of a first LED filament of the plurality of LED filaments is at least substantially vertically aligned with an upper end of a second linear LED filament of the plurality of LED filaments. Moreover, the plurality of LED filaments may further comprise a third LED filament positioned between the first LED filament and the second LED filament.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Lighting manufacturers, particular those manufacturing high-efficiency Light Emitting Diode (LED) lighting products (e.g., light bulbs) often seek certification of various lighting products as ENERGY STAR® certified products. In particular, the ENERGY STAR® certification process for light bulbs is based on a set of publicly-available product specifications that includes specifications for light bulb size, directional light emissivity, various photometric performance characteristics, product life, electrical performance, and control performance, among a number of other highly specific product requirements. Due at least in part to the highly stringent certification requirements and testing procedures involved with obtaining ENERGY STAR® certification, consumers have grown to view products having ENERGY STAR® certification as being of high quality.

For LED light bulbs, ENERGY STAR® certification is available for omnidirectional light bulbs and for decorative light bulbs, and each category of bulb type has a separate set of performance requirements to meet ENERGY STAR® certification. Omnidirectional bulbs are subject to a more stringent set of performance requirements, as these bulbs are rated as general service replacement bulbs that may be used in place of more traditional incandescent bulbs in various lighting applications. Decorative bulbs are not necessarily designed for use in general lighting applications (these bulbs may be traditionally used instead as accent lighting in certain applications), and therefore the number of typical uses is much lower than that of omnidirectional bulbs.

Figure 1:
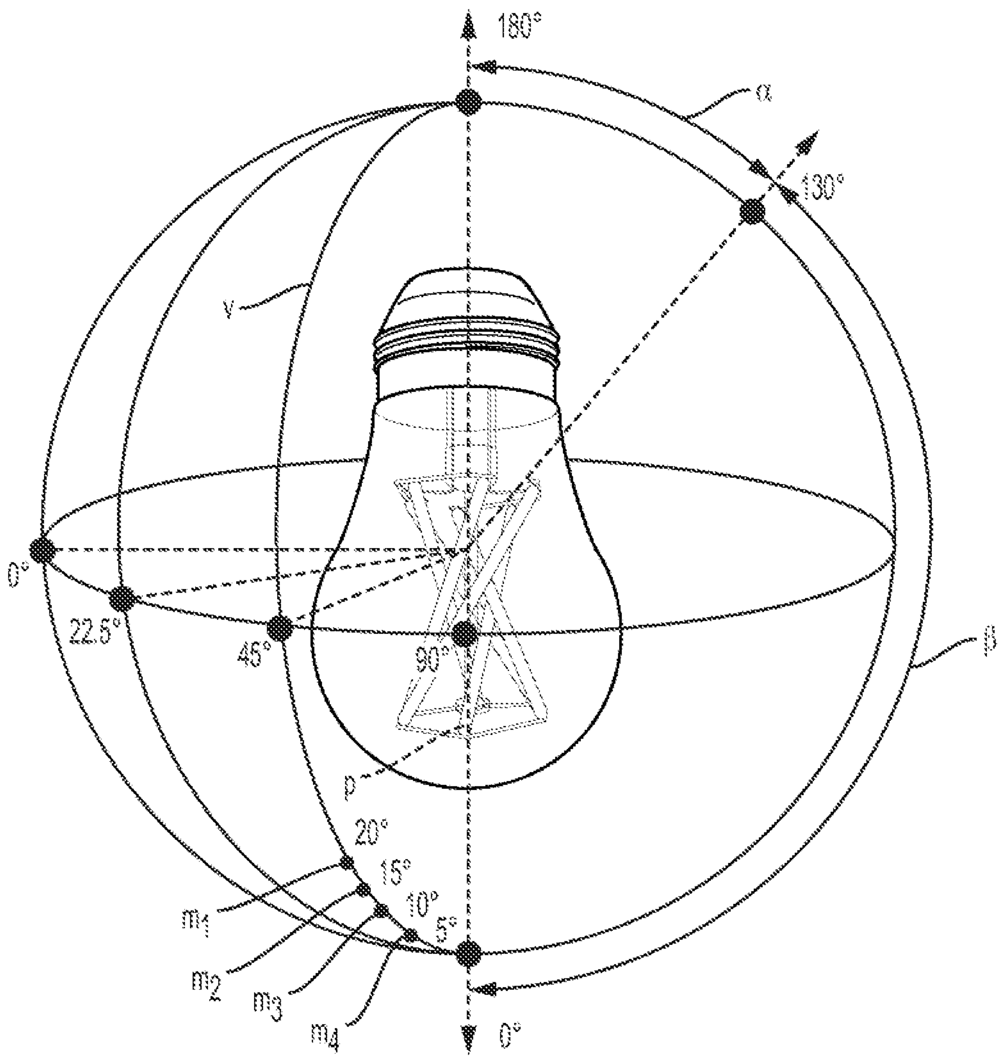
FIG. 1 is a side view of a light bulb according to various embodiments including annotations relating to directional light emissivity requirements for certification as an omnidirectional light bulb.

Thus, ENERGY STAR® provides further specifications for omnidirectional bulbs to distinguish those bulbs from decorative bulbs. FIG. 1 provides a visual illustration of various measurement points around a light bulb that are used for certifying a bulb as omnidirectional. With reference to FIG. 1, the ENERGY STAR® certification of omnidirectional bulbs reviews the percentage of lighting flux emitted from the bulb at various points around the bulb itself. The certification references these points relative to a polar axis p extending through a center point of the light bulb base and globe. As shown in FIG. 1, the volume surrounding the bulb is divided into two regions based on the required level of lighting flux emitted from the bulb. Portion (3, extending between 0 degrees to 130 degrees relative to the polar axis p (with the portion of the polar axis above the bulb globe being 0 degrees and the portion of the polar axis below the bulb base being 180 degrees) has stringent requirements regarding the level of variation in flux emitted, and portion α—extending between 130 degrees to 180 degrees relative to the polar axis p is subject to standards for the percentage of total lighting flux emitted within this region. Specifically, at least 5% of total flux must be emitted within portion α. As for portion β, current ENERGY STAR® certifications specify that 80% of the measured luminous intensity values taking within portion β may vary by no more than 35% from the average of all measured values within portion β, and all measured values may vary by no more than 60% from the average of all measured values within portion β.

Luminous intensity measurements are taken within vertical planes v spaced at intervals of no more than 22.5 degrees around the polar axis p, and within each vertical plane at intervals of no more than 5 degrees about an axis perpendicular to the polar axis p. Example measurement points $m_1$-$m_4$ spaced at intervals of 5 degrees are shown along a single vertical plane v within FIG. 1.

Overview

Various embodiments are directed to omnidirectional decorative LED lightbulbs that may satisfy the ENERGY STAR® specification requirements for omnidirectional bulbs. Light bulbs according to various embodiments comprise a plurality of LED filaments arranged in a spiral orientation within the bulb such that each filament emits light both vertically from the bulb (e.g., through a top portion of the bulb globe) and laterally from the bulb. The LED filaments may each be linear LED filaments configured to emit light 360 degrees around a longitudinal axis of the LED filaments, and by placing the LED filaments in a spiral orientation (with each LED filament at an angle between vertical and horizontal relative to the longitudinal axis of the bulb as a whole) the resulting light is emitted substantially uniformly from the light bulb.

The LED filaments may be supported by a support stalk (e.g., a centrally-located support stalk) that is secured relative to a base portion of the bulb within the globe. The LED filaments and the support stalk collectively form a filament tree within the globe, and the filaments are both electrically and mechanically secured at top and bottom ends of the filaments relative to the support stalk. Those filaments are secured via conductor branches extending laterally away from the central support stalk, such that the filaments are spaced a distance away from the support stalk. The spacing of the filaments relative to the support stalk defines an outer diameter of the filament tree, which is smaller than an open bottom end of the globe to each manufacturing of the light bulb. In certain embodiments, the LED filaments are spaced a distance away from the central support stalk such that at least a portion of the light emitted by each of the LED filaments is emitted through portion $\alpha$ of the bulb (referring to FIG. 1).

Omnidirectional Decorative LED Lighting Device

Figure 2:
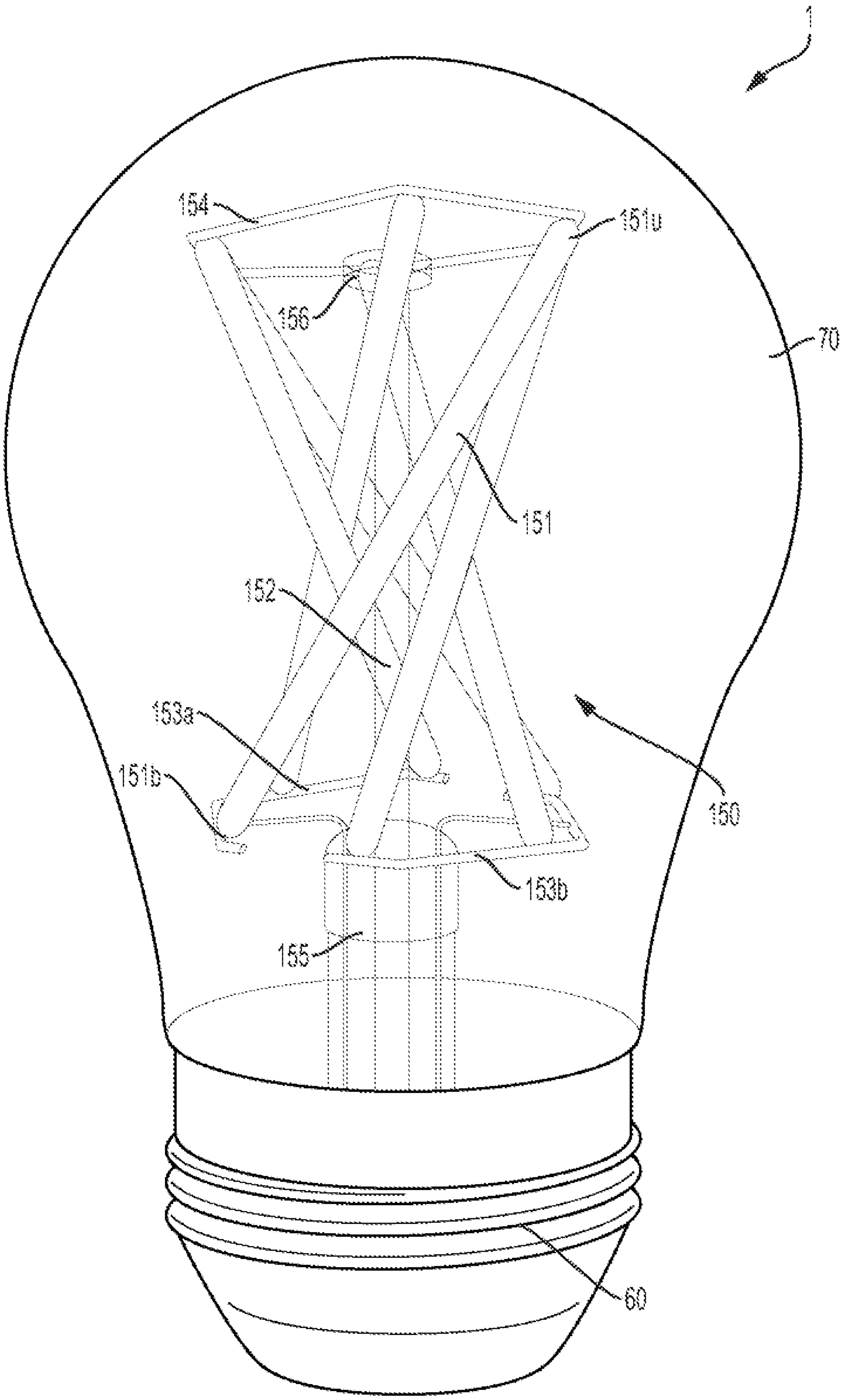
FIGS. 2-4 are perspective views of a light bulb according to various embodiments.
Figure 3:
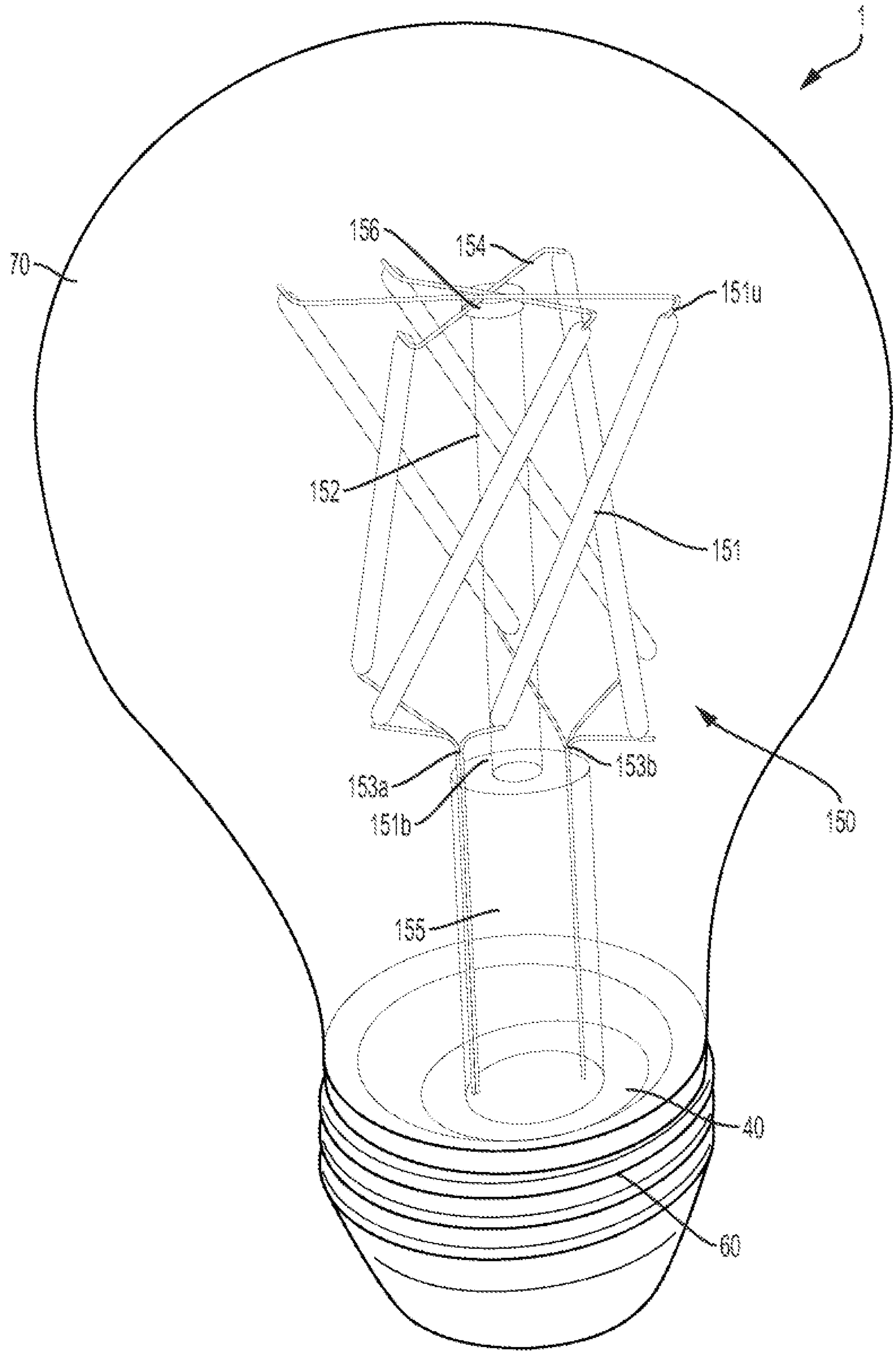
Figure 4:
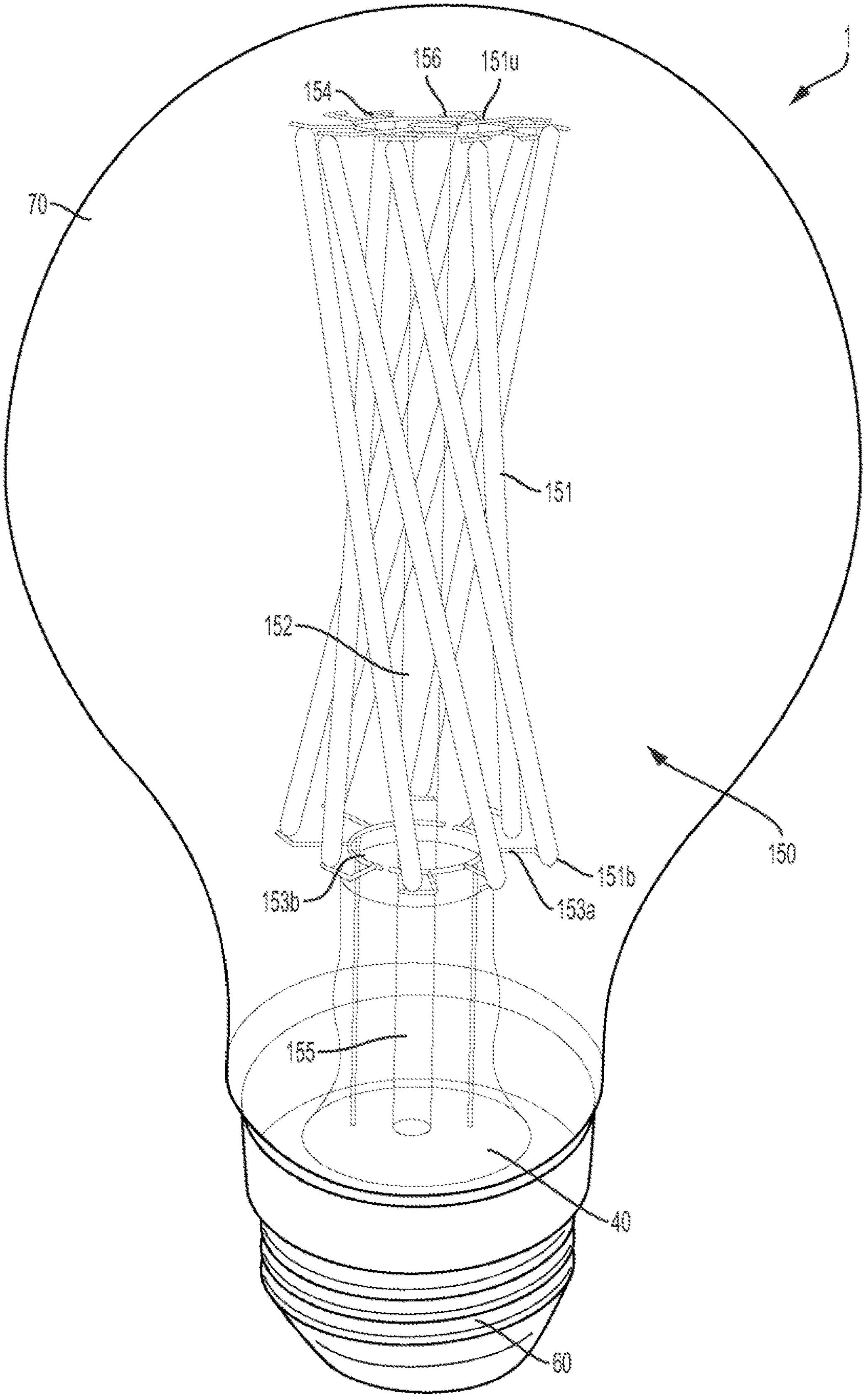
Figure 5:
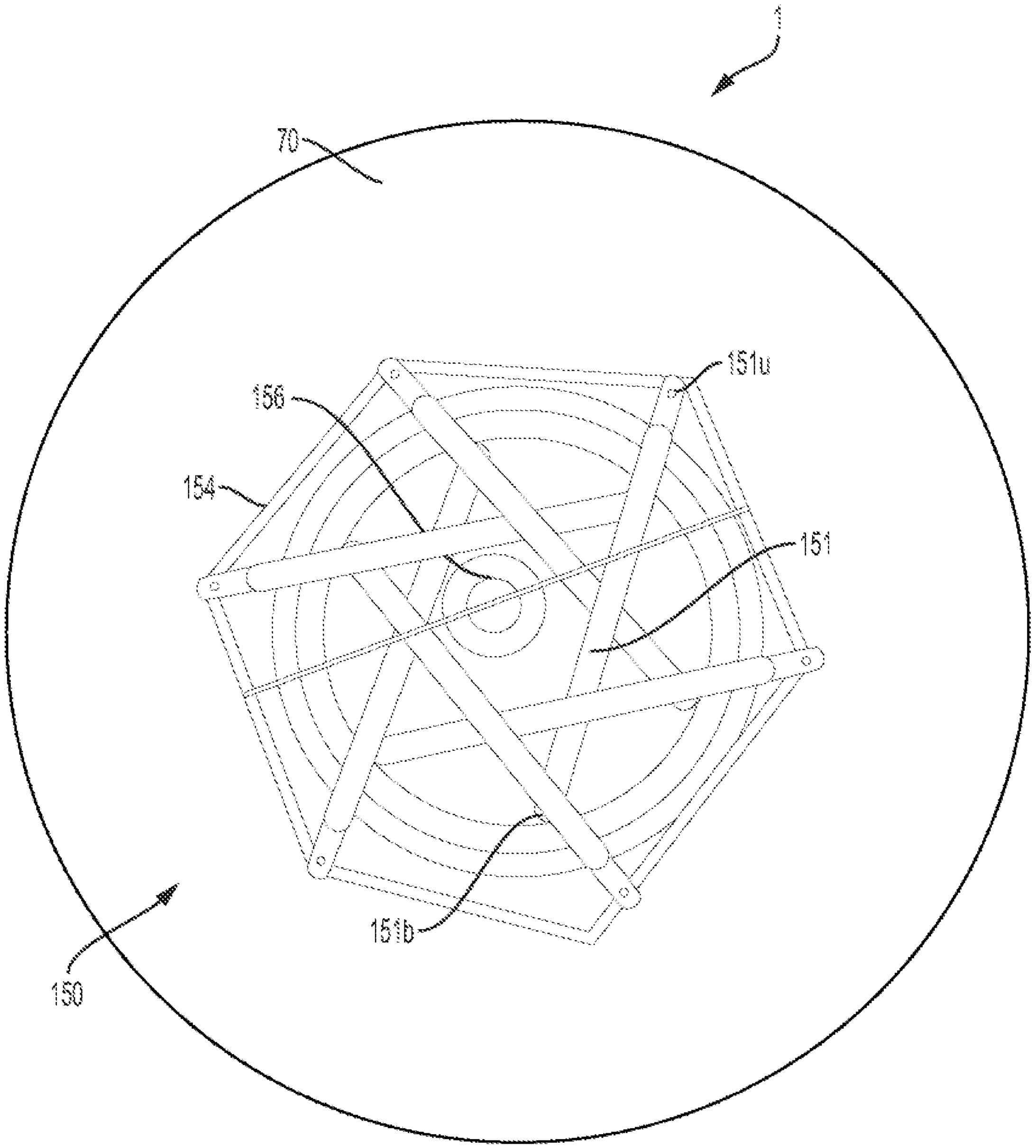
FIGS. 5-7 are top views of the light bulb configurations shown in FIGS. 2-4, respectively.
Figure 6:
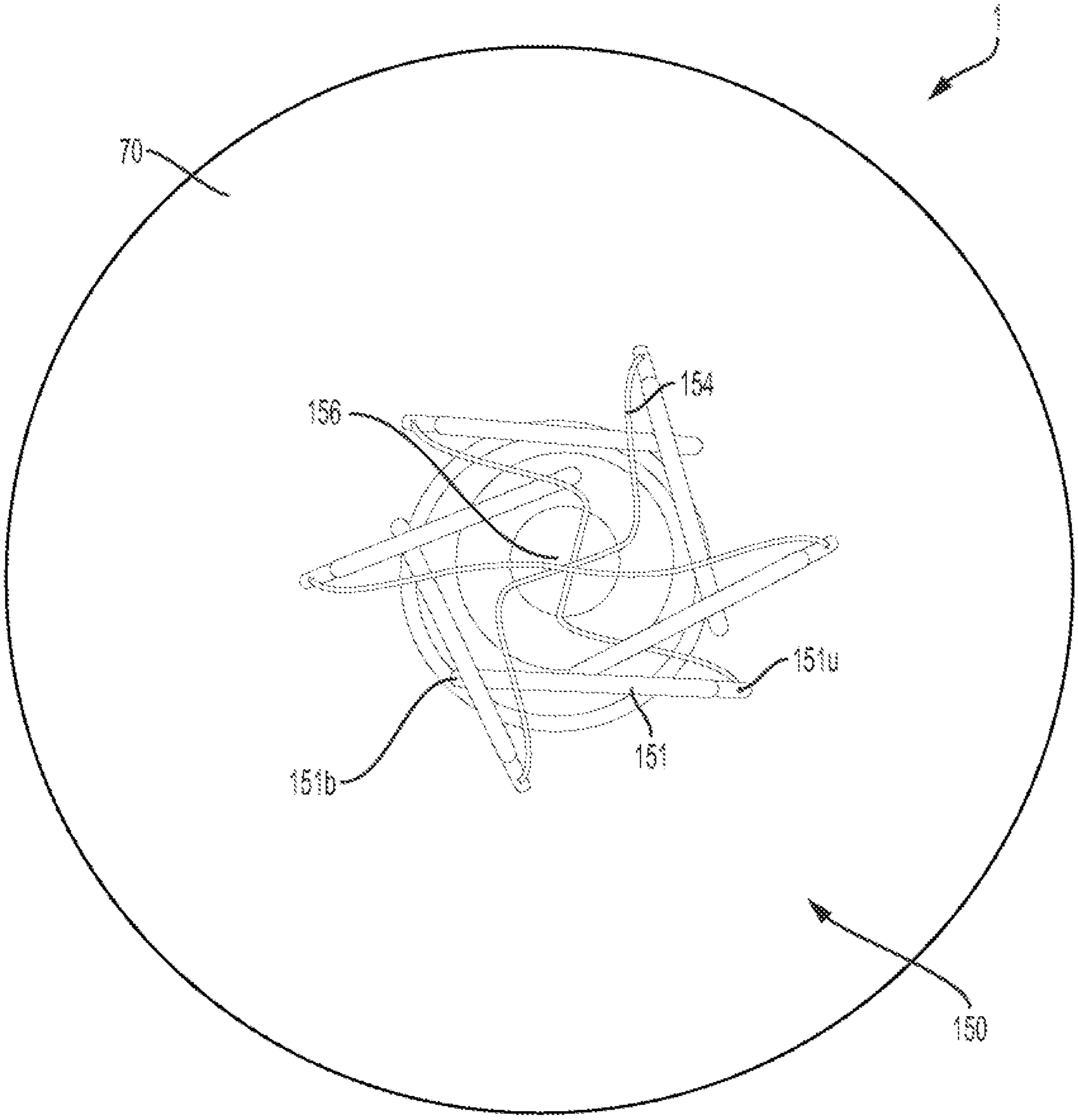
Figure 7:
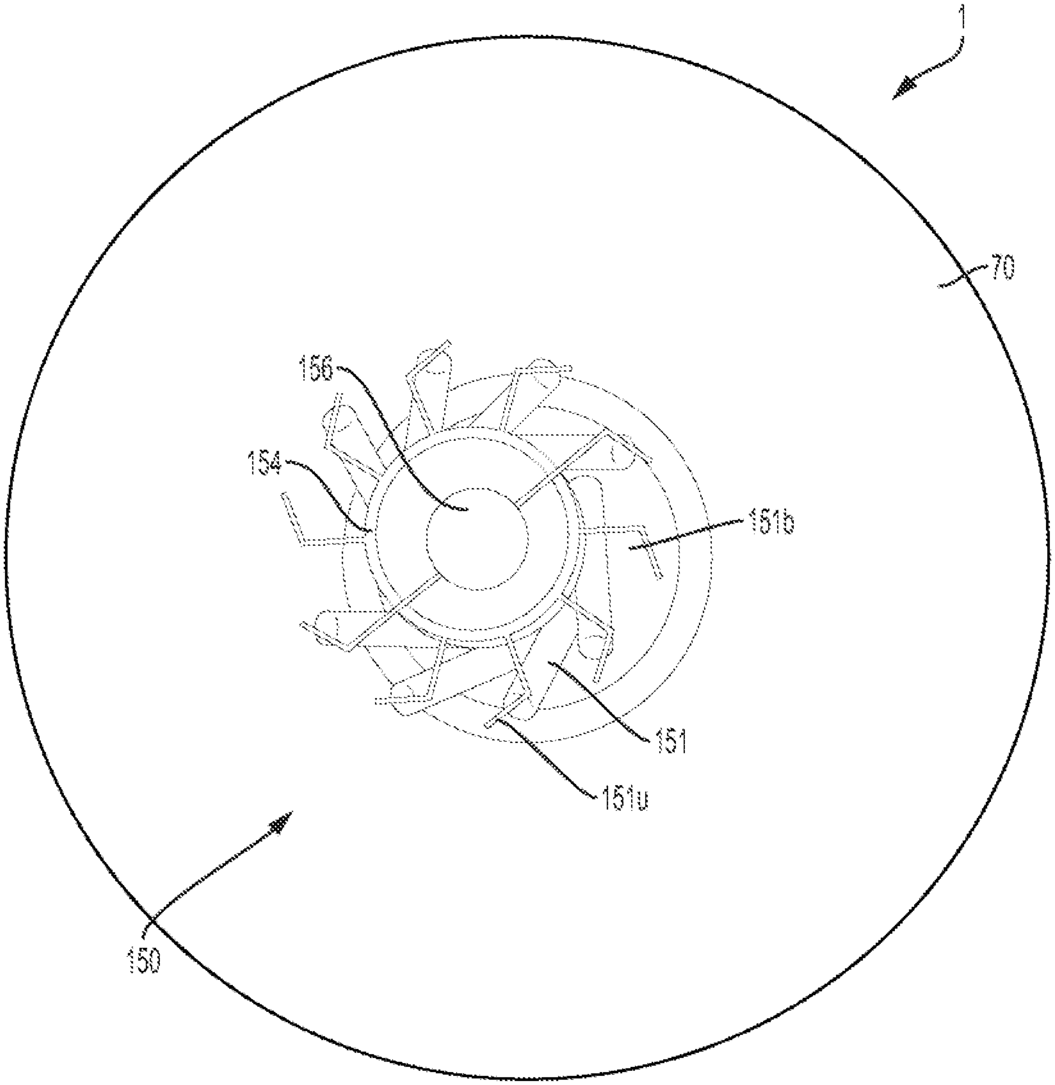

An LED lighting device may be an LED light bulb, lamp, lighting fixture or the like. FIGS. 2-4 show perspective views of example bulb-type LED lighting devices 1 and FIGS. 5-7 show top views of the LED lighting devices 1 of FIGS. 2-4, respectively. The illustrated embodiment of a bulb type LED lighting device 1 comprises a lamp envelope 70, a base 60, and a filament tree 150.

In example embodiments, the base 60 may be configured to allow the LED lighting device 1 to be screwed or otherwise secured into a light socket (e.g., the light socket of a generic lamp, lighting fixture, and/or the like), and to receive electrical energy therethrough. For example, the base 60 may be an Edison type base, A19 base, and/or the like. In various embodiments, the base 60 may be configured to physically secure the LED lighting device 1 into a socket and provide an electrical connection between the driver circuitry (e.g., comprising one or more LED driver circuit 40 including circuitry components) and a power supply (e.g., line voltage, a battery). Some embodiments of the LED lighting device 1 may not comprise a base. For example, embodiments of the LED lighting device 1 that are lamps or lighting fixtures may comprise a housing that is configured to be mounted to a wall or ceiling or placed on a surface (e.g., table, desk, counter, etc.).

In certain embodiments, the base 60 may comprise a metallic outer shell configured for electrical connection with a light socket, and may comprise a non-conductive internal housing enclosing the LED driver circuit 40 and/or other components of the LED lighting device 1.

In various embodiments, a lamp envelope 70 may be configured to disperse the light emitted by one or more LED filaments 151 mounted within a filament tree 150 within the LED lighting device 1, to enclose the one or more LEDs 151 within the LED lighting device 1, and/or to provide the LED lighting device 1 with a particular aesthetic. In example embodiments, the lamp envelope 70 may be a globe or bulb. In the illustrated embodiment, the lamp envelope 70 is configured to provide the LED lighting device 1 with the appearance of a clear incandescent light bulb, and the visible LED filaments 151 provide the aesthetic of a decorative Edison-style incandescent bulb. Although not shown, the lamp envelope 70 may comprise and/or be configured to accommodate secondary optical components configured to condition the light emitted by the one or more LEDs. Moreover, the illustrated embodiments comprise a clear lamp envelope 70, although it should be understood that the lamp envelope 70 may comprise a material having one or more translucent colors (e.g., white), such that the LED filaments 151 are not visible through the lamp envelope 70.

As shown in FIGS. 2-4, the LED lighting device 1 may also comprise a filament tree 150 supporting a plurality of LED filaments 151 relative to a centrally-located support stalk 152. Each of the LED filaments 151 may be elongated, and may extend from a first end 151*b* (e.g., a bottom end) to a second end 151*u* (e.g., a top end). The LED filaments 151 may comprise electrically conducting end portions configured to be secured within a circuit (e.g., to be secured relative to lower and upper conductor branches 153, 154 extending radially from the support stalk 152). The conducting end portions are secured relative to a centrally-located elongated light emitting portion of the LED filament 151. The light emitting portion of the LED filament 151 emits light when exposed to an electrical current. The LED filament 151 is configured to emit light at an at least substantially even flux distribution about the entire perimeter of the LED filament 151 (e.g., with a 360 degree emission). However, due at least in part to the configuration of the LED filament 151 (having an elongated side surfaces and relatively small end edges), each LED filament 151 may not emit a substantial amount of light in a direction parallel with a longitudinal axis of the LED filament 151.

With reference to FIGS. 2-4, the central support stalk 152 is secured relative to a base portion 155, which itself is secured relative to the LED driver circuit 40 and/or a portion of the base 60. In certain embodiments, the central support stalk 152 comprises a clear, rigid, and nonconductive material, such as clear glass. Similarly, the base portion 155 comprises a clear, rigid, and nonconductive material (e.g., glass), and may comprise the same material as the support stalk 152. In such embodiments, the support stalk 152 may be integrally formed with the base portion 155. However, it should be understood that the support stalk 152 and base portion 155 may comprise any of a variety of nonconductive materials, such as plastic (e.g., polycarbonate, polyvinyl chloride, and/or the like). In such embodiments, the support stalk 152 and base portion 155 may not be clear, and instead may be translucent or opaque). Moreover, the base portion may be secured relative to the LED driver circuit 40 via any of a variety of fasteners. For example, the base portion 155 may be secured relative to the LED driver circuit 40 via an adhesive. Moreover, the base portion 155 may comprise a plurality of conductor wires extending therethrough to electrically connect the LED driver circuit 40 with lower conductors 153*a*, 153*b* associated with the LED filaments 151. The conductor wires may be embedded within the base portion 155, and/or may be disposed along an outside surface of the base portion 155.

The central support stalk 152 extends vertically, along an axis at least substantially aligned with the central longitudinal axis of the LED lighting device 1. The central support stalk 152 may be at least substantially cylindrical, however it should be understood that the central support stalk may have any of a variety of cross-sectional shapes (e.g., rectangular, square, hexagonal, triangular, and/or the like). In certain embodiments, as shown in FIGS. 2-4, a distal end of the support stalk 152 may comprise a stalk cap 156 having a cross-sectional area larger than the remainder of the support stalk 152. The stalk cap may be configured to support one or more conductor branches that may be secured relative to various LED filaments 151. For example, connectors (e.g., mechanical connectors) may be partially embedded within the stalk cap 156 of the support stalk 152 and connected to the one or more upper conductor branches 154 to mechanically secure the upper conductor branches relative to the support stalk 152.

As shown in the figures, the conductor branches 153*a*, 153*b*, 154 mechanically and electrically connect the LED filaments 151 relative to other portions of the LED lighting device 1. Mechanically, the conductor branches 153*a*, 153*b*, 154 are secured relative to the central support stalk 152 (e.g., via an adhesive, by integrally forming the conductor branches within a softened material of the support stalk 152, and/or the like. Electrically, the lower conductor branches 153*a*, 153*b* form a series-type connection with portions of the LED driver circuit 40, and may form parallel-type connections with a plurality of LED filaments 151 within the filament tree 150.

As shown in the figures, the conductor branches comprise lower conductor branches 153*a*, 153*b* and upper conductor branches 154. The lower conductor branches 153*a*, 153*b* may be in direct electrical connection with portions of the LED driver circuit 40 (e.g., without intervening circuit components), and may connect a lower end of the LED filaments 151 relative to the LED driver circuit 40. The upper conductor branches 154 may be configured to electrically connect the upper ends 151*u* of all of the LED filaments 151 relative to one another to form a complete circuit.

The complete electrical circuit flowing from the LED driver circuit 40 through the LED filaments 151 may proceed from the LED driver circuit 40, to a first plurality of LED filaments 151 (the first plurality of LED filaments connected in parallel) at first lower conductor branches 153*a* connecting the first plurality of LED filaments 151. The first plurality of LED filaments 151 (as a grouping) are connected in series to a second plurality of LED filaments 151 (the second plurality of LED filaments connected in parallel relative to one another) at the upper conductor branches 154. The second plurality of LED filaments 151 are the connected relative to the LED driver circuit 40 via second lower conductor branches 153*b*. In other words, the electrical flow through the filament tree 150 proceeds from the LED driver circuit 40, through the first lower conductor branches 153*a*, through the first plurality of LED filaments 151 (connected in parallel), through the upper conductor branches 154, then through the second plurality of LED filaments 151 (connected in parallel), which are connected in series relative to the first plurality of LED filaments 151, and then back to the LED driver circuit 40.

The conductor branches may be embodied as individual conductor wires extending radially outward from the support stalk 152. For the lower conductor branches 153*a*, 153*b*, a first plurality of conductor branches 153*a* may be electrically connected relative to one another (to form a parallel electrical connection at the lower end of the first grouping of LED filaments 151) and a second plurality of conductor branches 153*b* may be electrically connected relative to one another (to form a parallel electrical connection at the lower end of the second grouping of LED filaments 151). For the upper conductor branches 154, all of the conductor branches may be electrically connected relative to one another, to form a series connection between the first plurality of LED filaments and the second plurality of LED filaments.

As shown in FIG. 2, the lower conductor branches 153*a*, 153*b* may be embodied as bent conductors extending between the lower ends 151*b* of the LED filaments 151. The lower conductor branches 153*a*, 153*b* may form halves of a complete hexagon, separated by a space therebetween. The lower ends 151*b* of the LED filaments 151 may be secured (e.g., via soldering) relative to portions of the hexagon halves (or other shaped ring), and the lower conductor branches 153*a*, 153*b* may be mechanically secured relative to the support stalk 152 (e.g., a base portion 155 of the support stalk 152) via one or more conducting wires in electrical connection with the LED driver circuit 40. The upper conductor branches 154 may be embodied as a complete hexagon (or other endless shape) mechanically secured relative to the support stalk 152 (e.g., secured relative to the stalk cap 156). The upper ends 151*u* of the LED filaments 151 may be secured (e.g., via soldering) relative to portions of the endless upper conductor branches 154 to connect the first plurality of LED filaments 151 in series to the second plurality of LED filaments 151.

As shown in FIG. 3, the lower conductor branches 153*a*, 153*b* may be embodied as clusters of conductor wires extending from a portion of the support stalk 152 (e.g., a base portion 155 of the support stalk). For example, the first lower conductor branches 153*a* may be embodied as a cluster of conducting wires in electrical connection with the LED driver circuit 40 and mechanically secured at a first point within the support stalk 152. A first cluster of lower conductor branches 153*a* extends radially outward from a first point of the support stalk 152, and the lower ends 151*b* of a first grouping of LED filaments 151 are secured relative to distal ends of the respective lower conductor branches 153*a*. The first cluster of conductor branches 153*a* are electrically connected to a first point of the LED driver circuit 40 (e.g., an output connection of the LED driver circuit). Similarly, a second cluster of lower conductor branches 153*b* extends radially outward from a second point of the support stalk 152, and the lower ends 151*b* of a second grouping of LED filaments 151 are secured relative to distal ends of the respective lower conductor branches 153*b*. The second cluster of conductor branches 153*b* are electrically connected to a second point of the LED driver circuit 40 (e.g., an input connection of the LED driver circuit, for example, connecting to ground). The upper conductor branches 154 may be embodied as a cluster of radially-extending conductor wires that are electrically connected relative to one another and mechanically secured relative to the support stalk (e.g., secured relative to the stalk cap 156), such that the upper ends 151*u* of each of the LED filaments 151 are secured (e.g., via soldering) to a distal end of a respective upper conductor branch 154.

As shown in FIG. 4, the lower conductor branches 153*a*, 153*b* may be embodied as semiannular conductor hubs mechanically secured relative to the support stalk 152 and having individual arms extending radially therefrom. The lower ends 151*b* of the LED filaments 151 may be secured (e.g., via soldering) relative to the individual arms of the semiannular conductor hubs. The upper conductor branches 154 may be embodied as an annular conductor hub mechanically secured relative to the support stalk 152 (e.g., secured relative to the stalk cap 156) and having individual arms extending radially therefrom. The upper ends 151*u* of the LED filaments 151 may be secured (e.g., via soldering) relative to the individual arms of the annular conductor hubs to connect the first plurality of LED filaments 151 in series to the second plurality of LED filaments 151.

Moreover, as shown in the figures, the LED filaments 151 are secured relative to the filament tree 150 in a twisted configuration. As mentioned previously, the LED filaments 151 may be linear LED filaments 151, and accordingly the twisted configuration may be provided based on the radial positioning of the lower end 151*b* and upper end 151*u* of each LED filament 151 relative to the central support stalk 152. As shown in the top view illustrations of FIGS. 5-7, the upper end 151*u* of each LED filament 151 may be radially displaced relative to the lower end 151*b* of the respective LED filament 151 to provide a twisted orientation of the LED filaments 151 relative to the central support stalk 152. The LED filaments 151 may be generally parallel to one another around the perimeter of the central support stalk 152. Moreover, viewed from above (in FIGS. 5-7), the LED filaments 151 overlap one another, such that a portion of a first LED filament 151 overlaps the lower end 151*b* of at least a second LED filament 151 extending from the lower end 151*b* to the upper end 151*u*. In certain embodiments, the LED filaments 151 may overlap portions of at least two LED filaments 151 when viewed from above.

As mentioned previously, the LED filaments 151 are secured relative to conductor branches 153*a*, 153*b*, 154 extending radially outward from the central support stalk 152. Accordingly, the lower end 151*b* and upper end 151*u* of each LED filament 151 are spaced a distance away from the central support stalk 152 corresponding to the length of the conductor branches 153*a*, 153*b*, 154. In certain embodiments, the lower conductor branches 153*a*, 153*b* and upper conductor branches 154 may have an at least substantially equal length. Again, when viewed from above, the upper ends 151*u* and lower ends 151*b* of the LED filaments 151 may lie on a circle surrounding the central support stalk 152, and each of the LED filaments 151 form a chord intersecting the circle. Accordingly, a central portion (between the lower end 151*b* and upper end 151*u*) of each LED filament 151 is laterally closer to the central support stalk 152 than the lower end 151*b* or upper end 151*u*.

Moreover, as mentioned above, each of the LED filaments 151 provide at least substantially uniform light flux emission from the lateral side of the LED filaments 151. Thus, by orienting the LED filaments 151 with an angle relative to the length of the central support stalk 152, the LED filaments 151 emit at least a portion of the emitted light in a vertical direction, thereby providing an at least substantially even light distribution emitted from the LED lighting device 1.

As shown in the figures, the filament tree 150 may comprise a plurality of LED filaments 151. For example, the filament tree 150 may comprise at least 4 filaments, at least 6 filaments, at least 8 filaments, and/or the like. The filament tree 150 may comprise an even number of filaments, such that the quantity of the first plurality of LED filaments 151 is the same as the quantity of the second plurality of LED filaments 151 within the separate parallel-connected groupings of LED filaments 151. The plurality of LED filaments 151 (including the first plurality and second plurality), may be spaced at least substantially evenly around the perimeter of the support stalk 152, to provide an at least substantially even light distribution emitted from the LED lighting device 1.

Example Method of Manufacturing an LED Light Device

Figure 8:
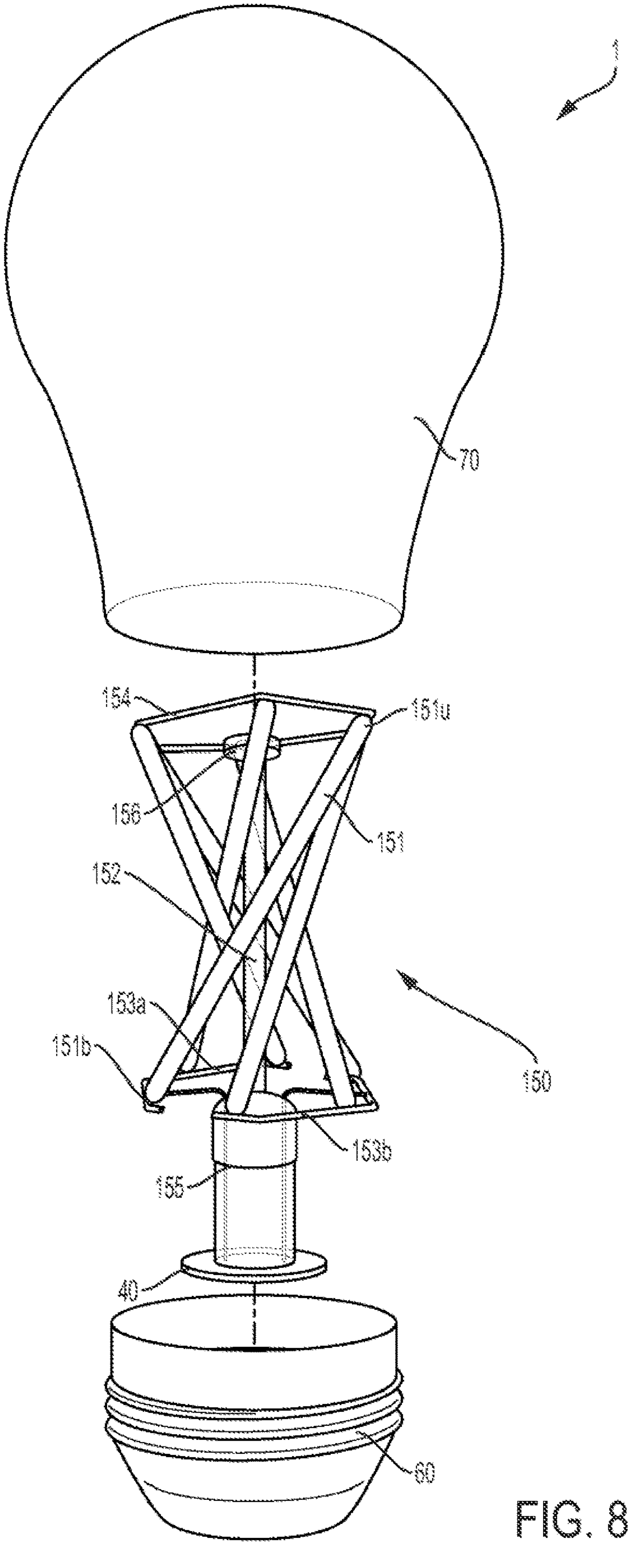
FIG. 8 is an exploded view of a light bulb according to one embodiment.
Figure 9:
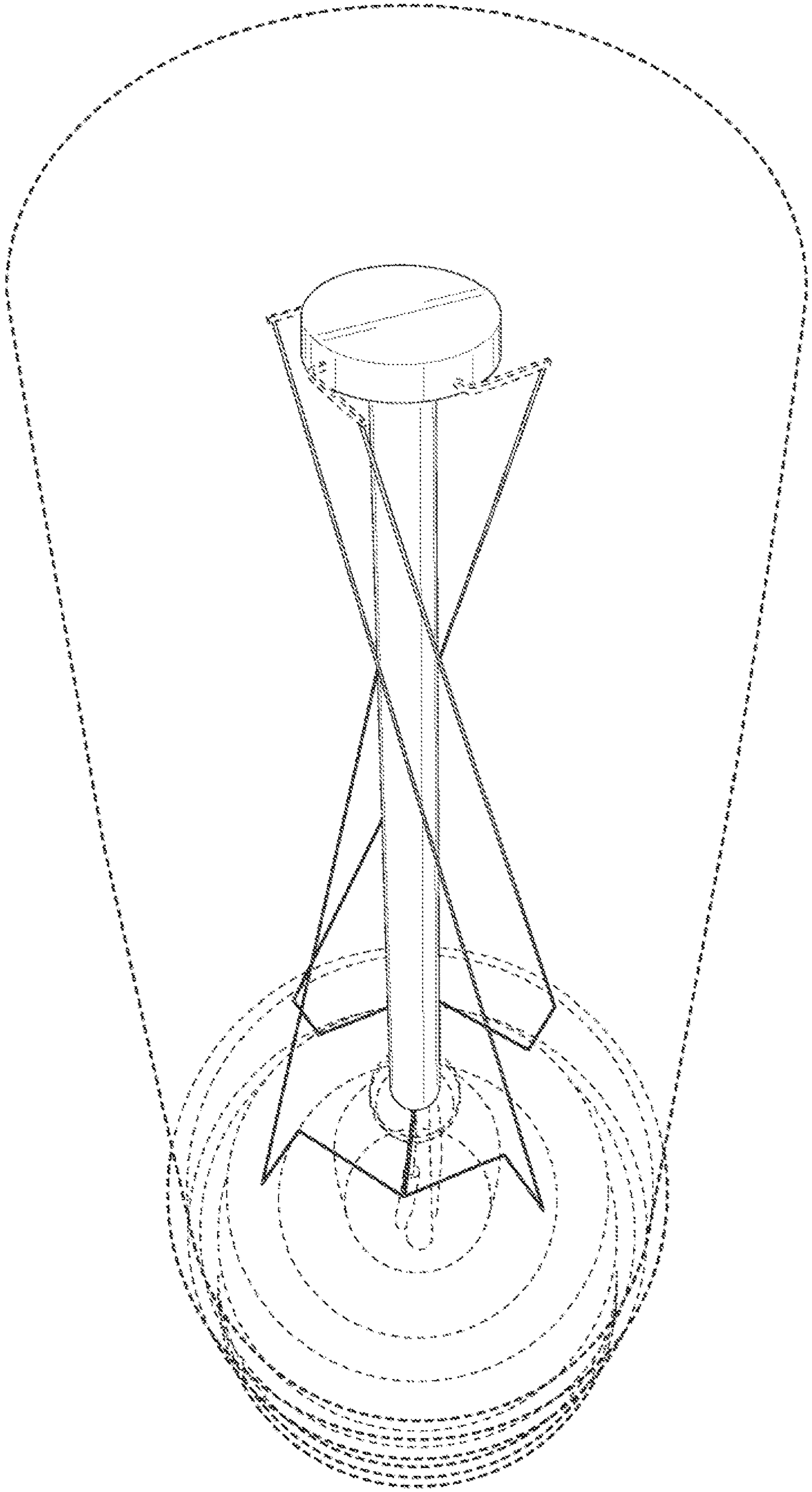
FIGS. 9-29 are various views of a light bulb according to various embodiments.
Figure 10:
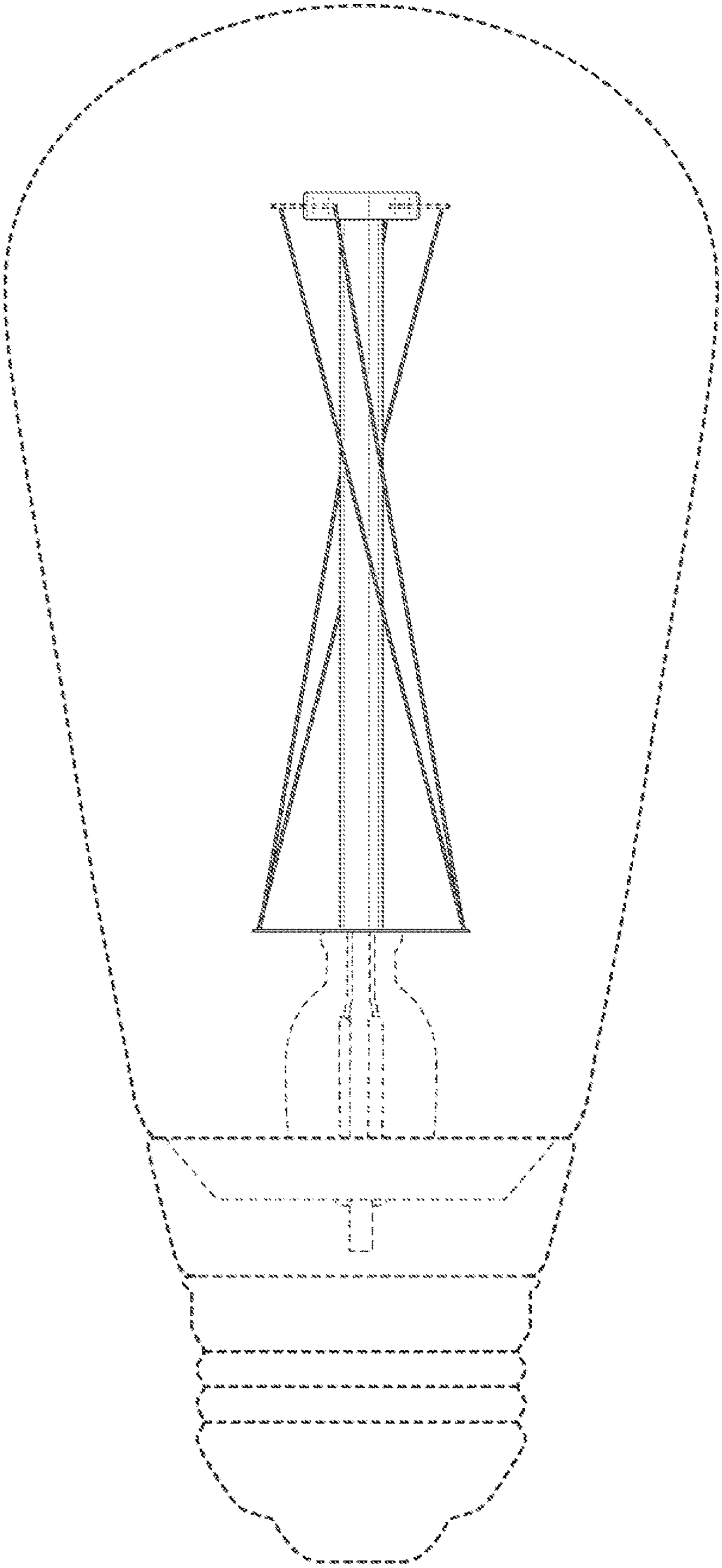
Figure 11:
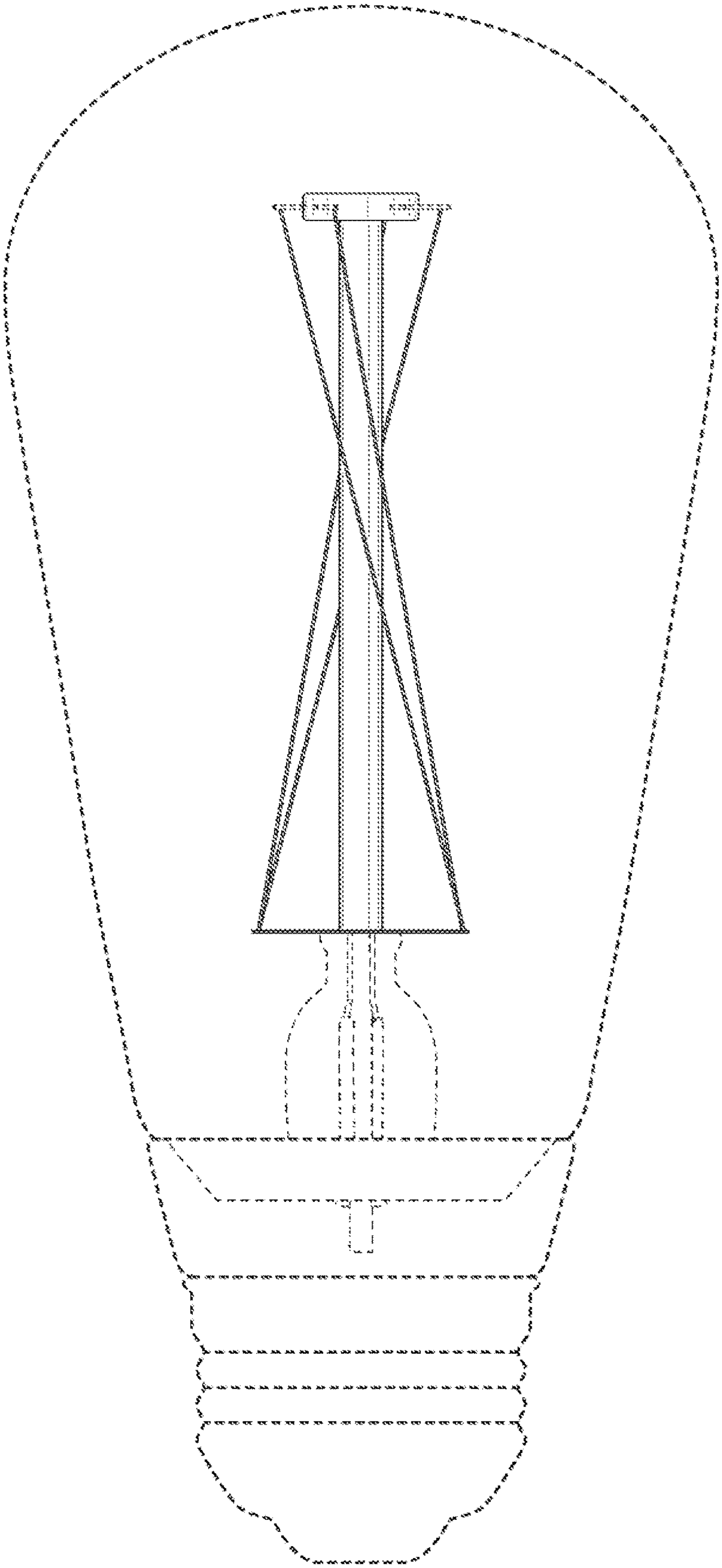
Figure 12:
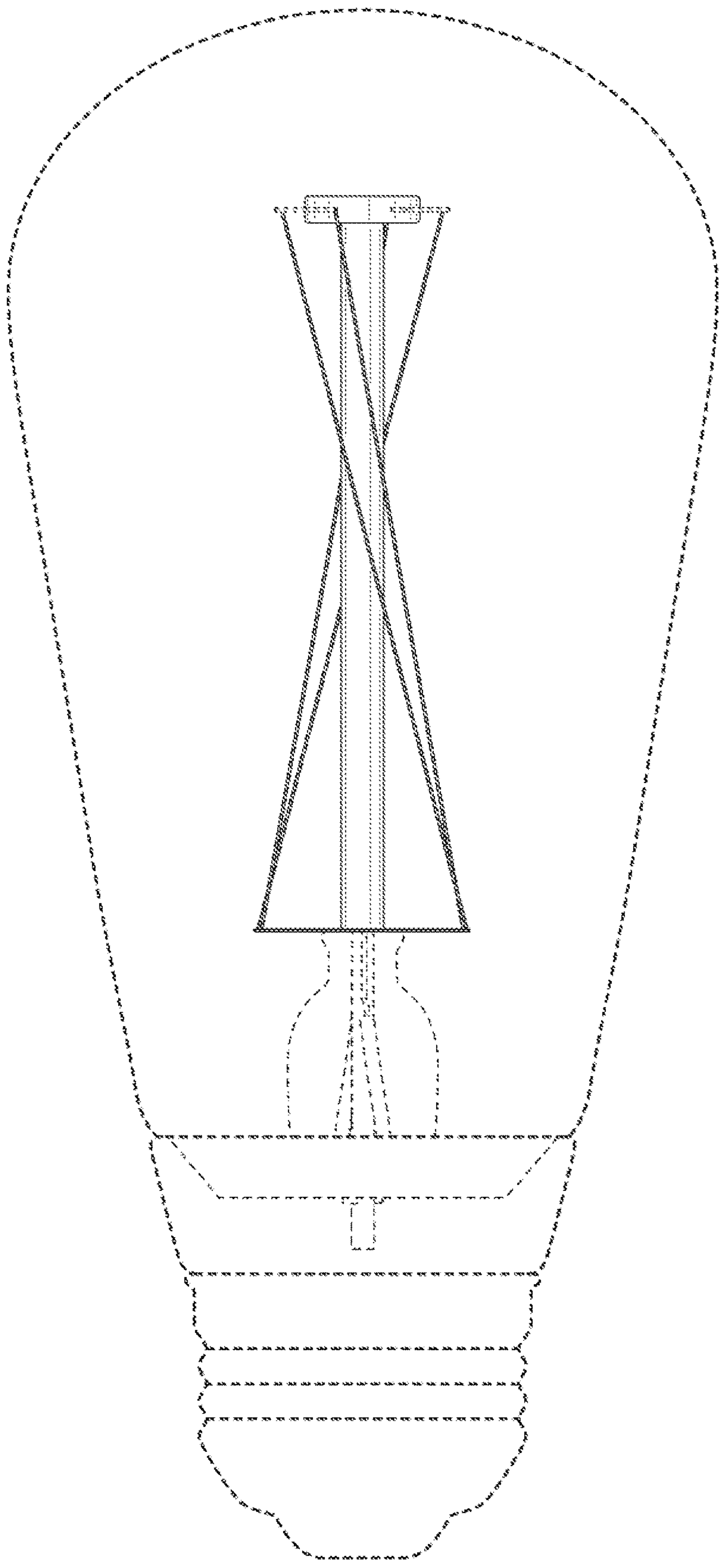
Figure 13:
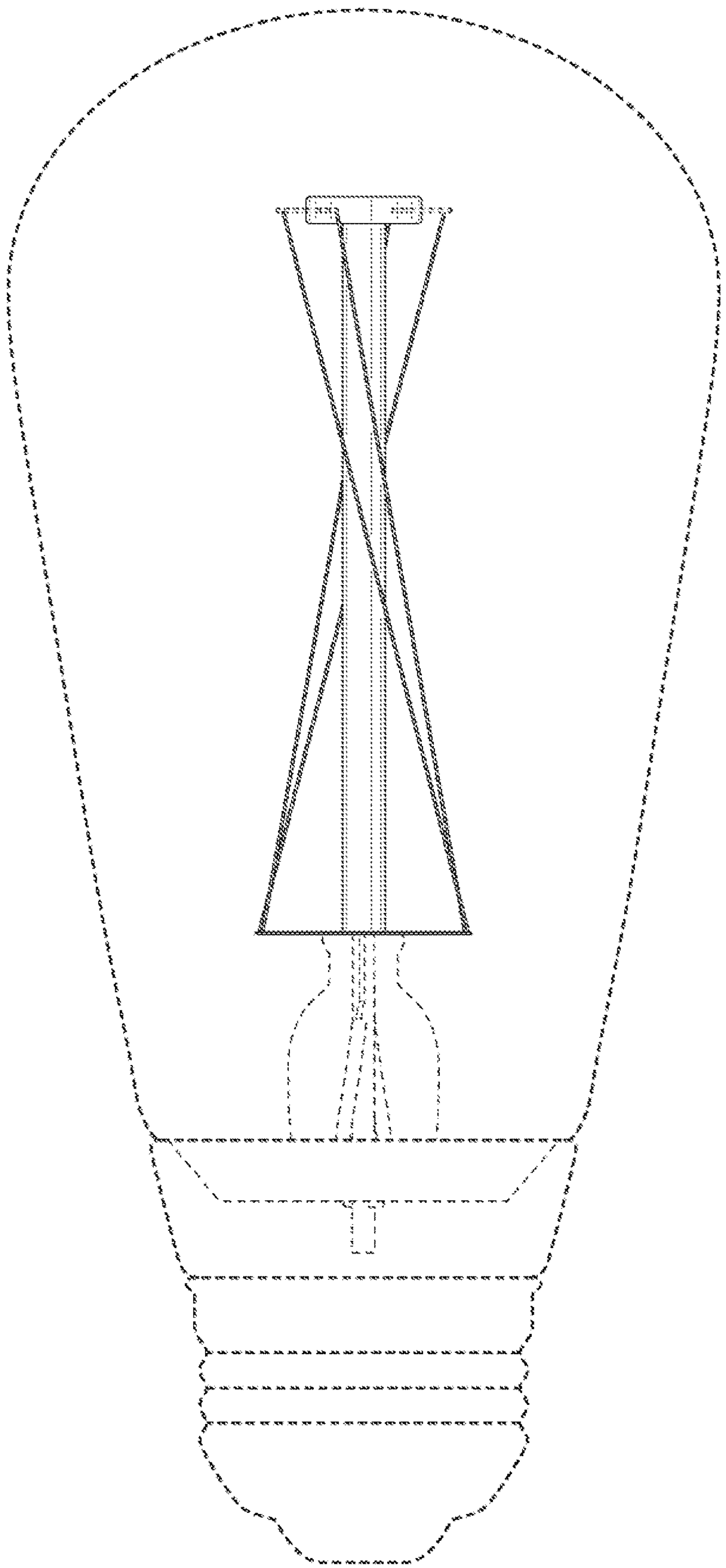
Figure 14:
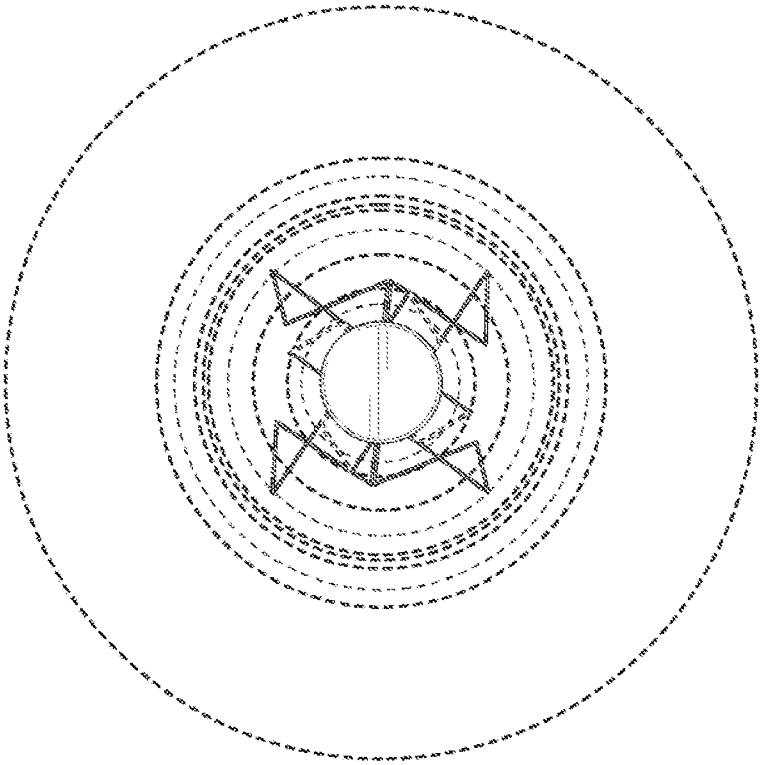
Figure 15:
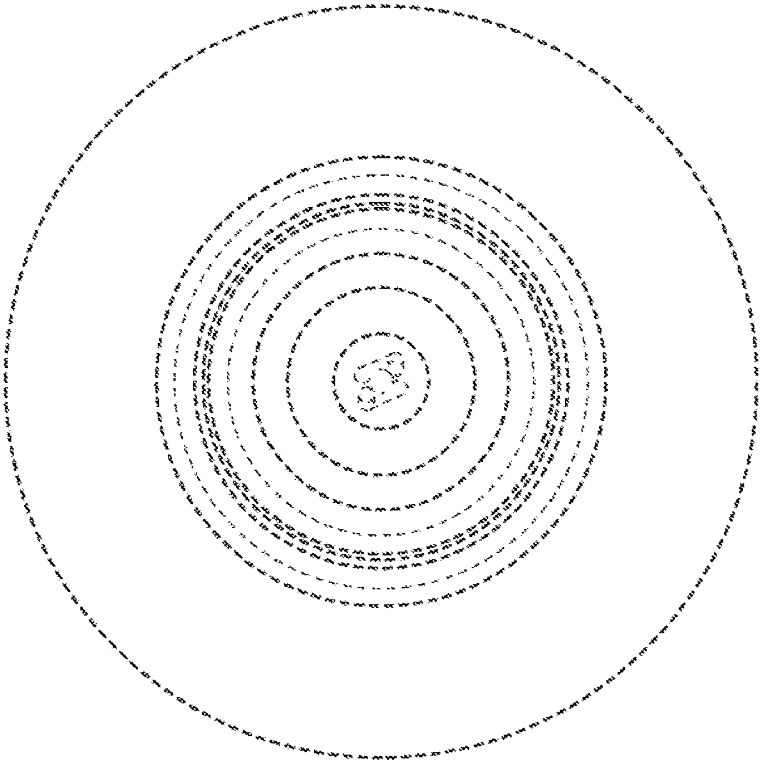
Figure 16:
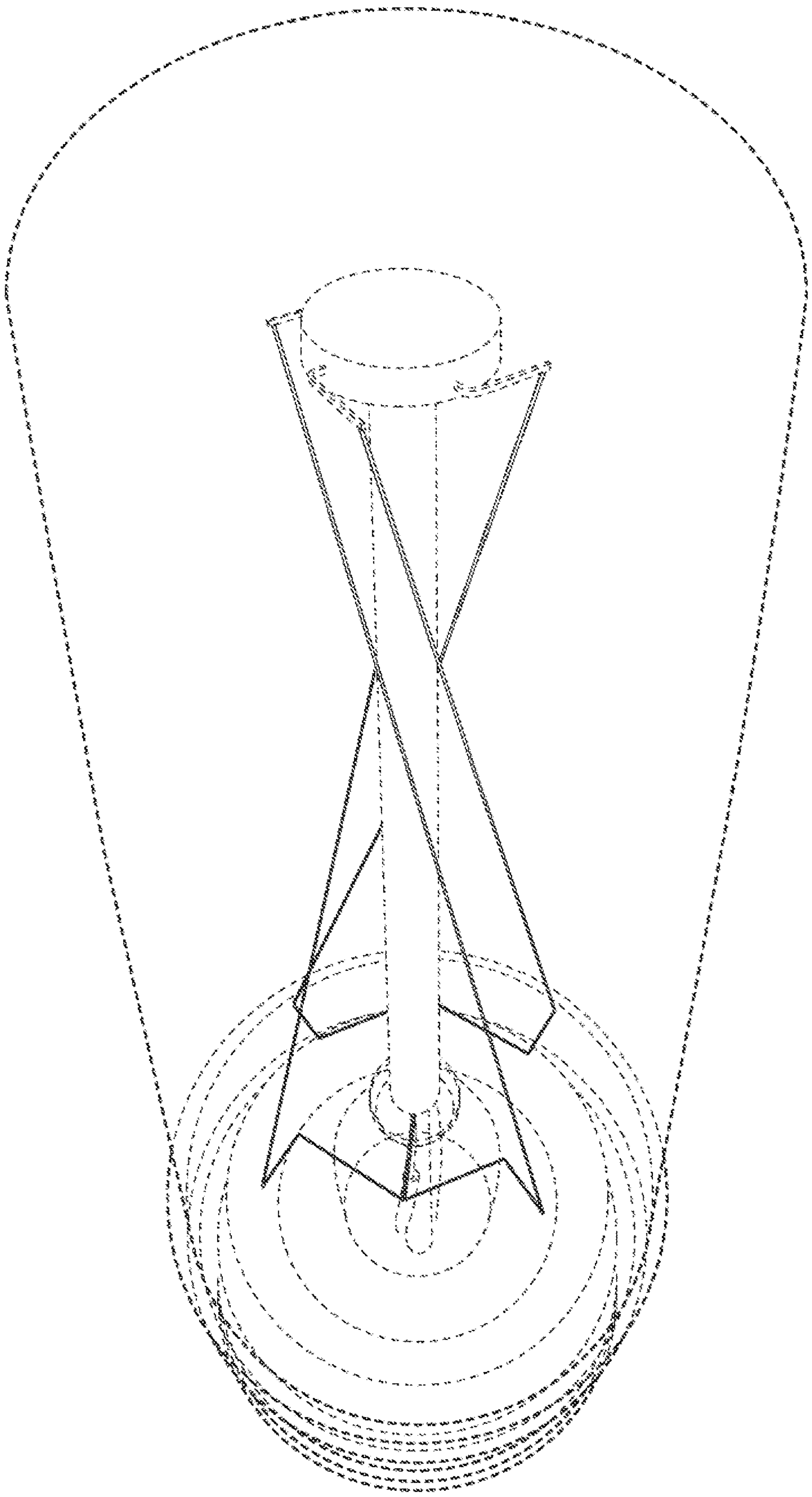
Figure 17:
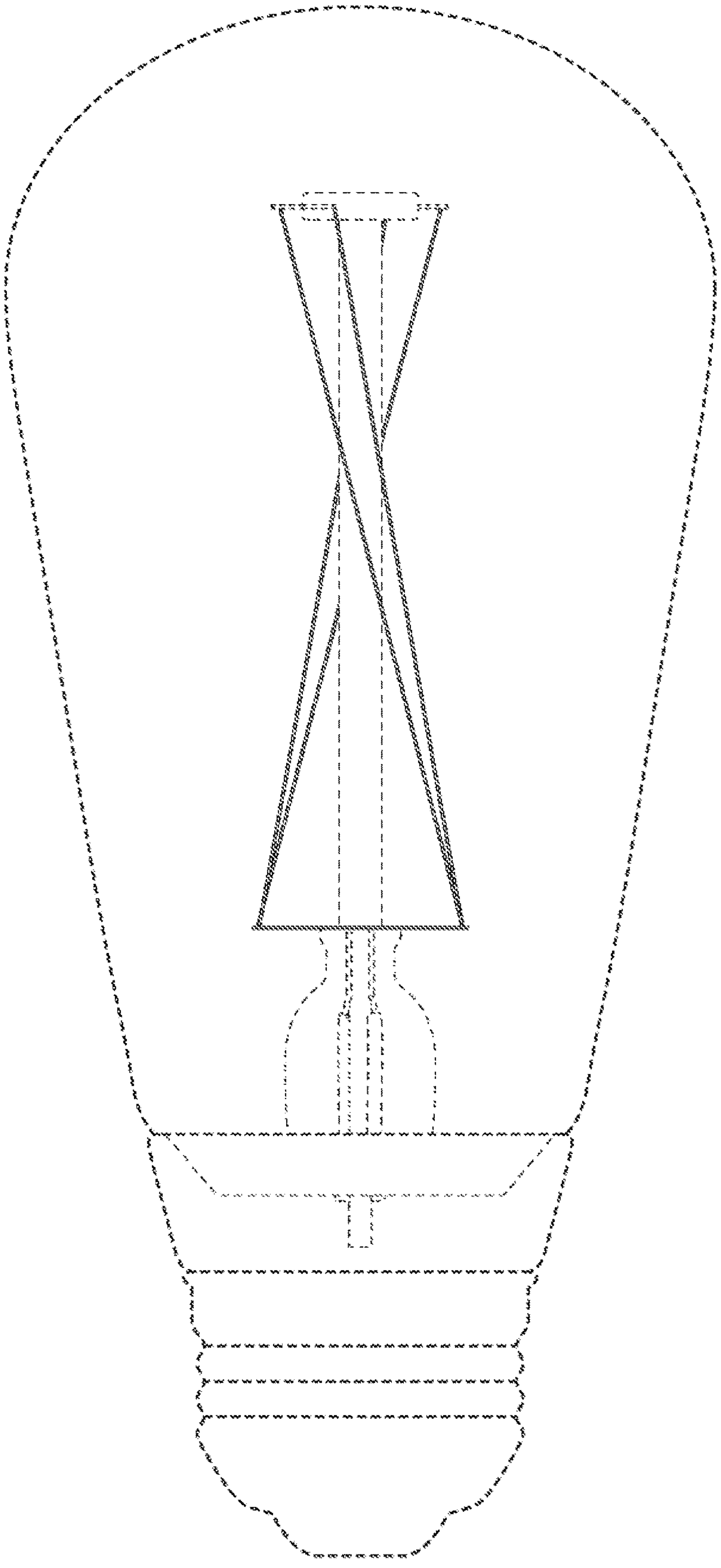
Figure 18:
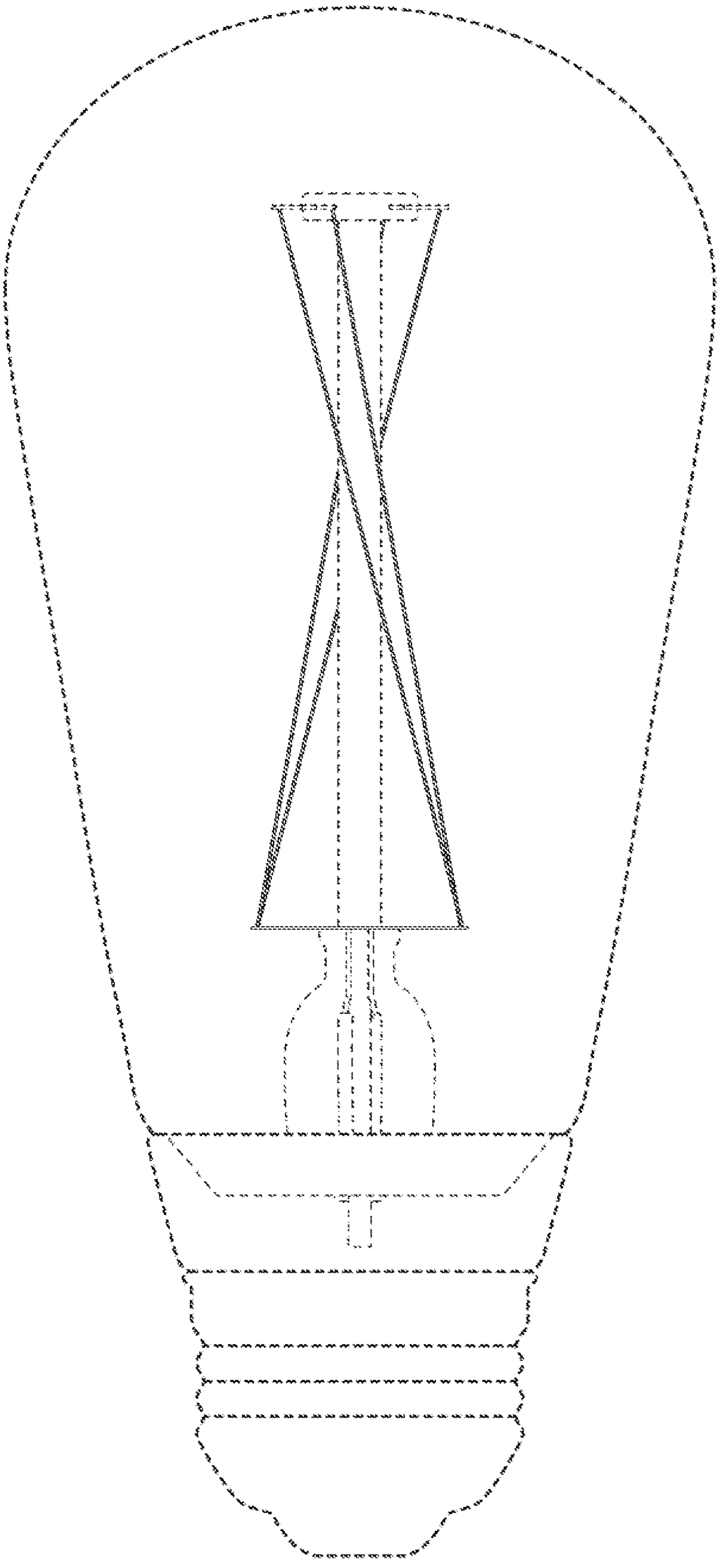
Figure 19:
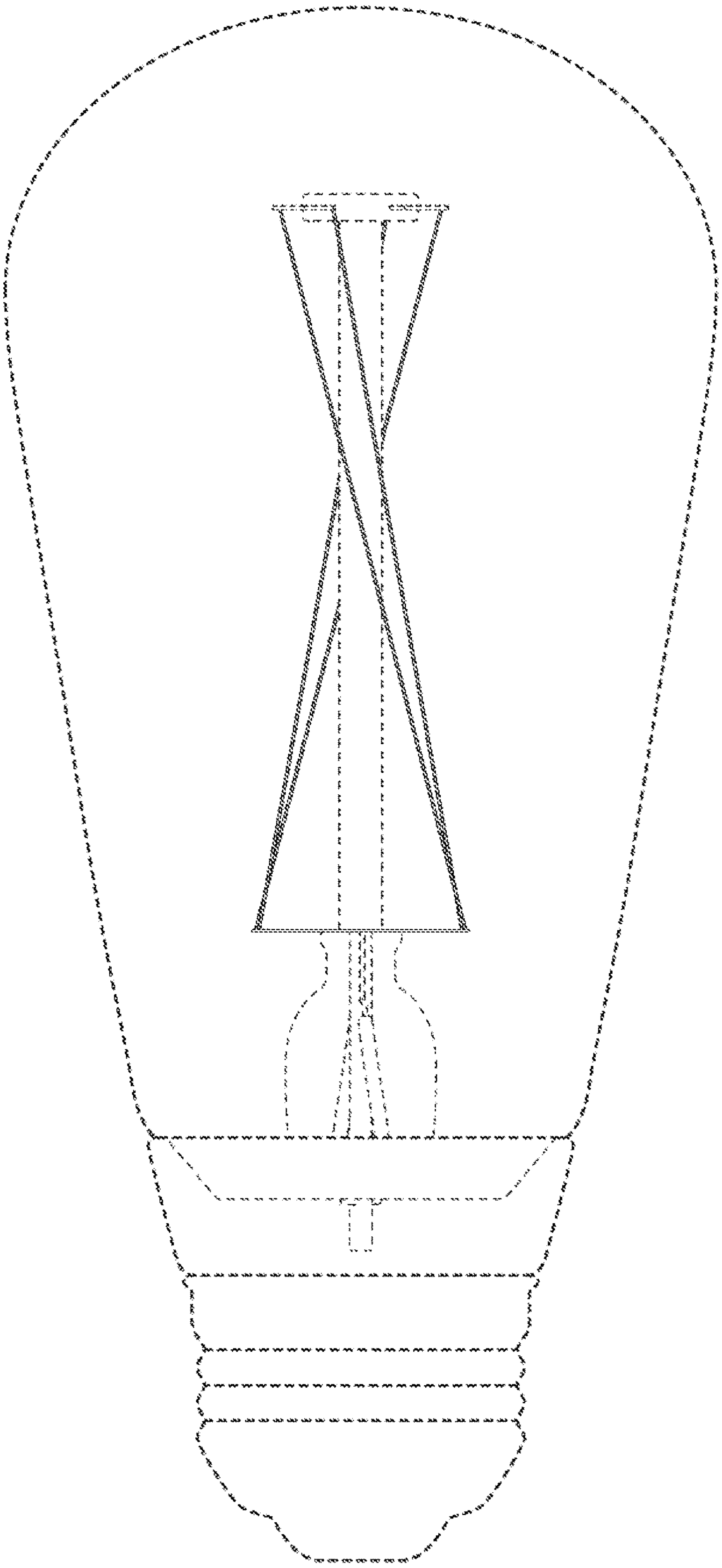
Figure 20:
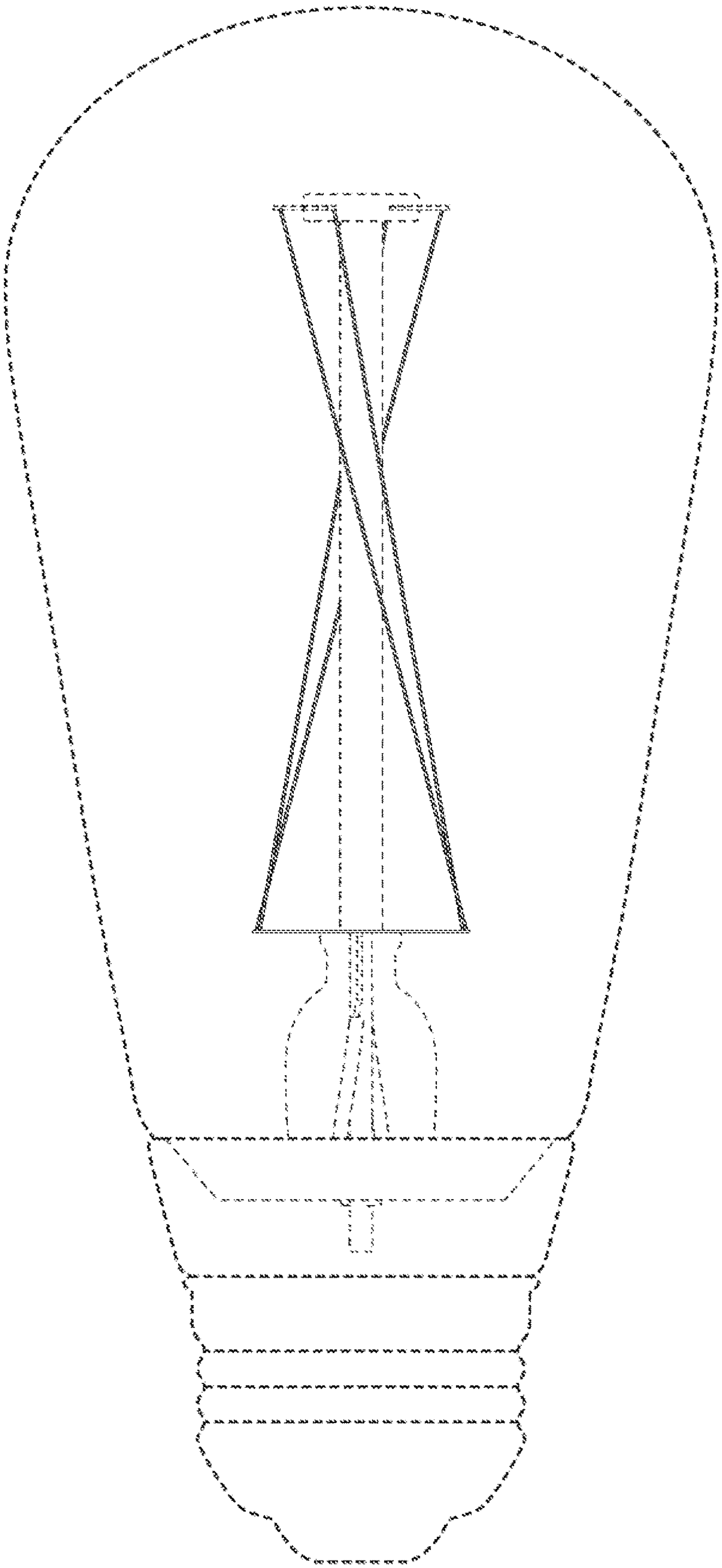
Figure 21:
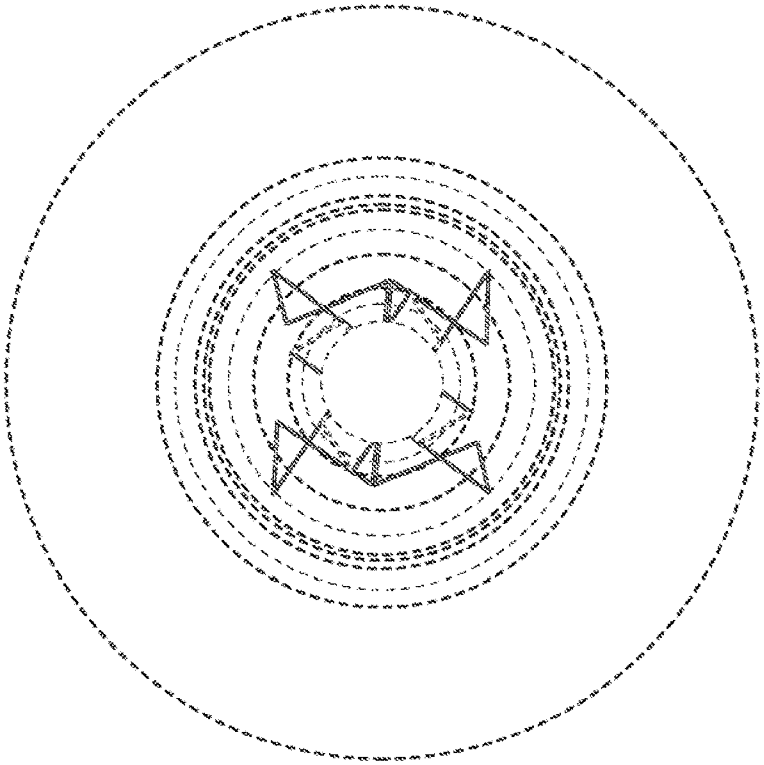
Figure 22:
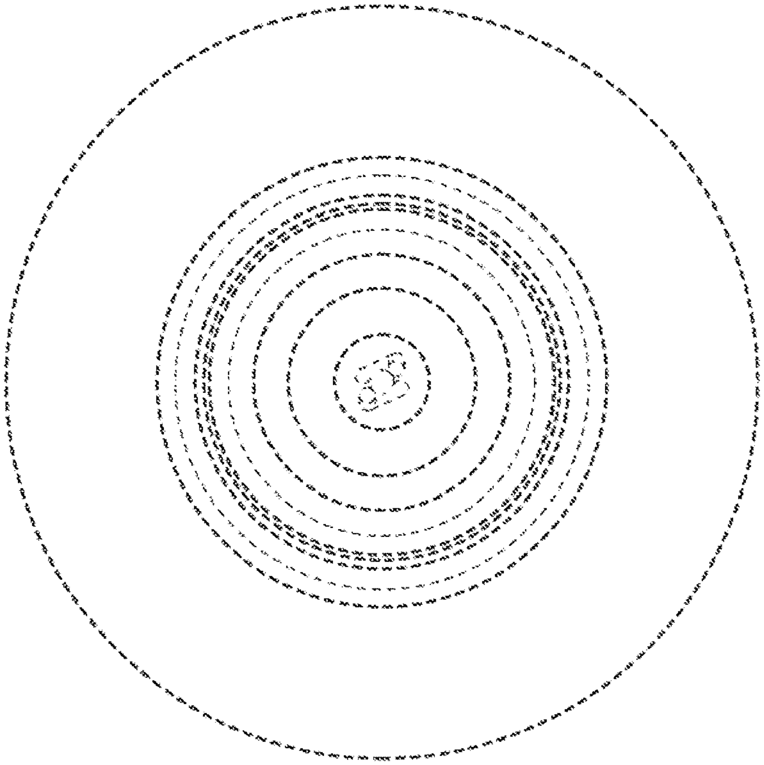
Figure 23:
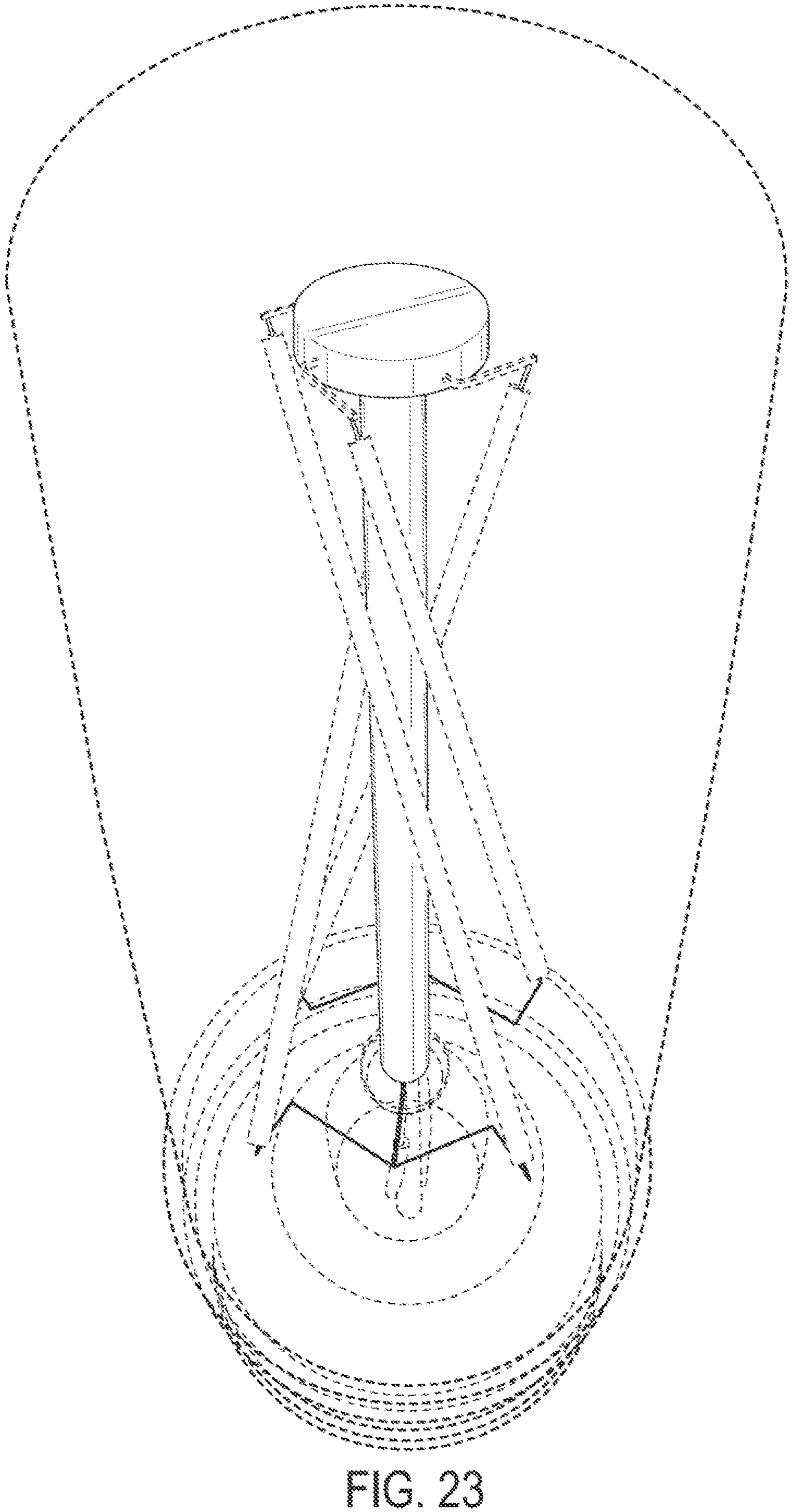
Figure 24:
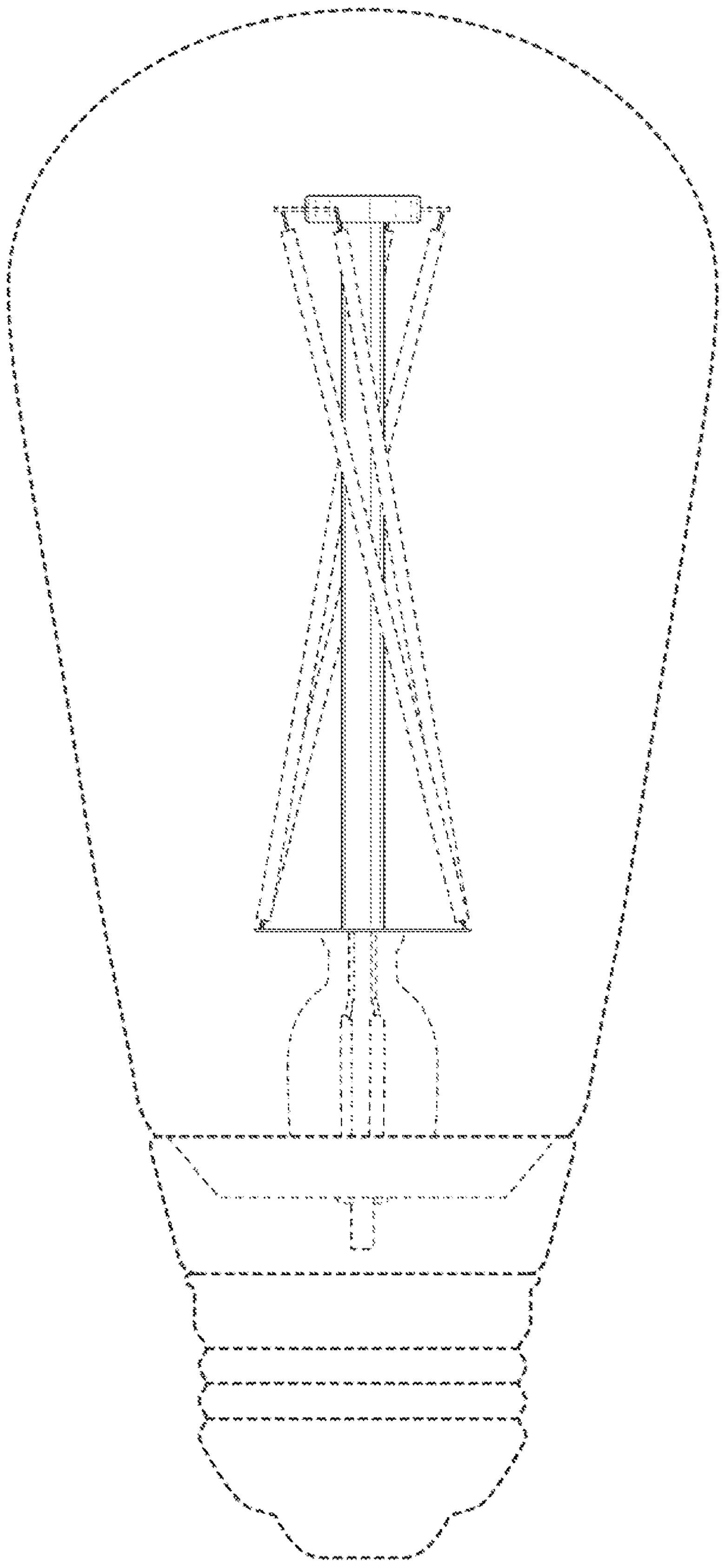
Figure 25:
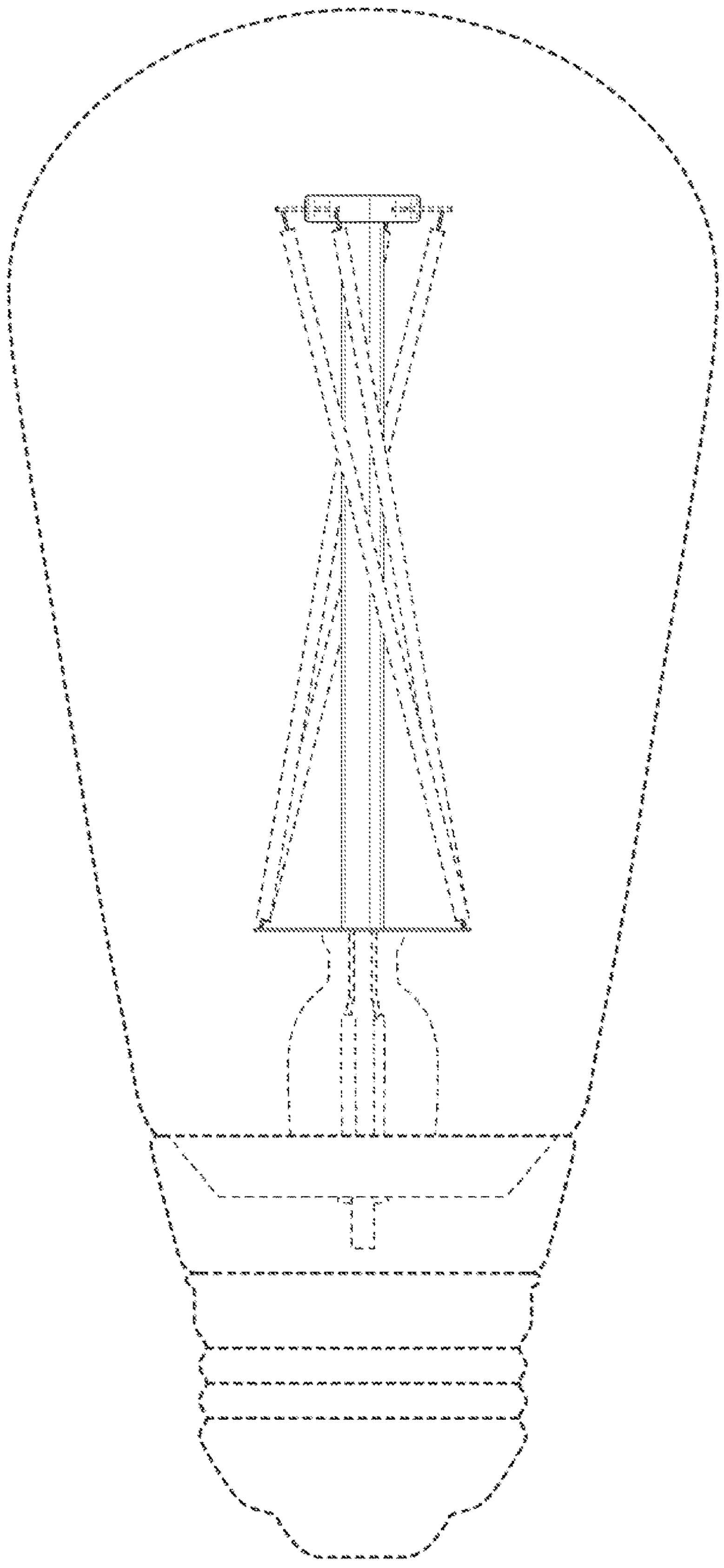
Figure 26:
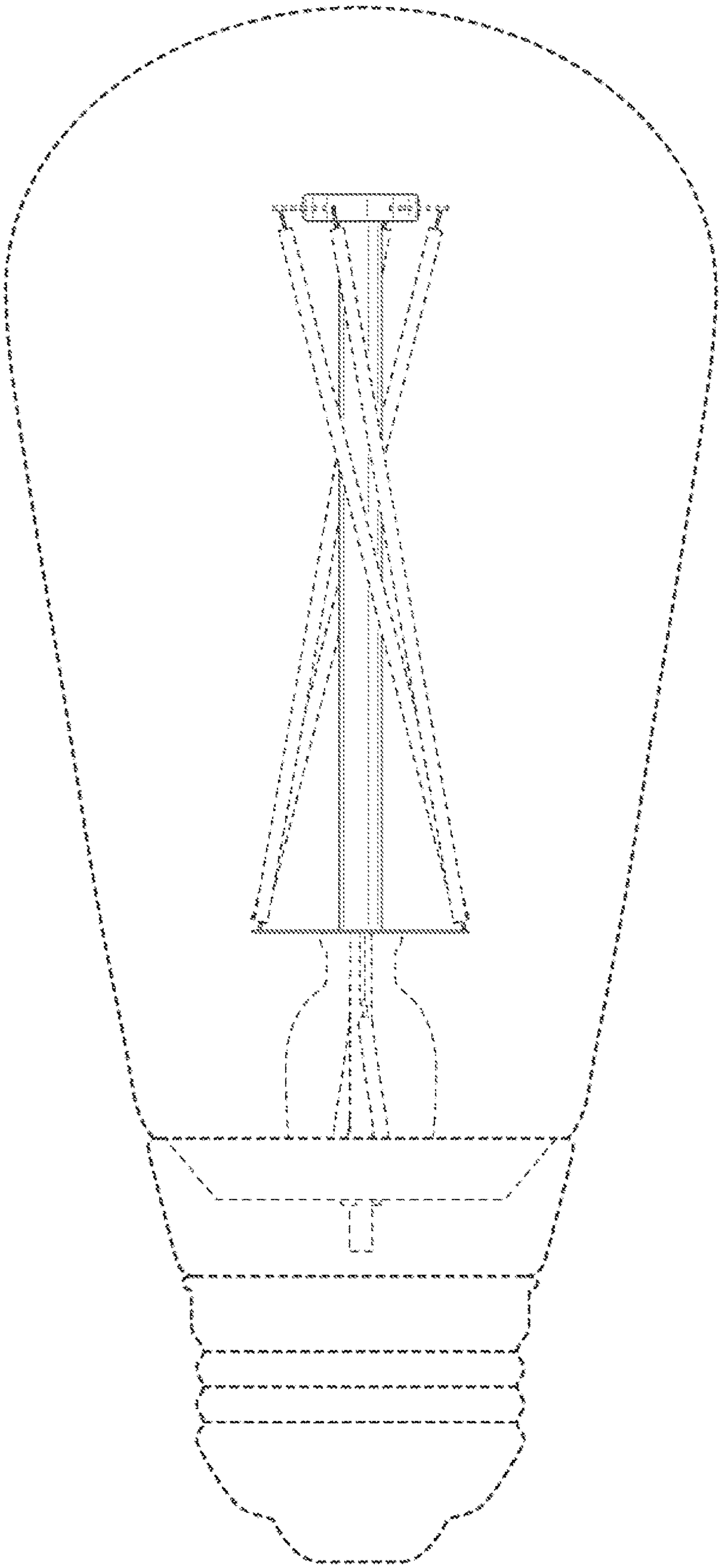
Figure 27:
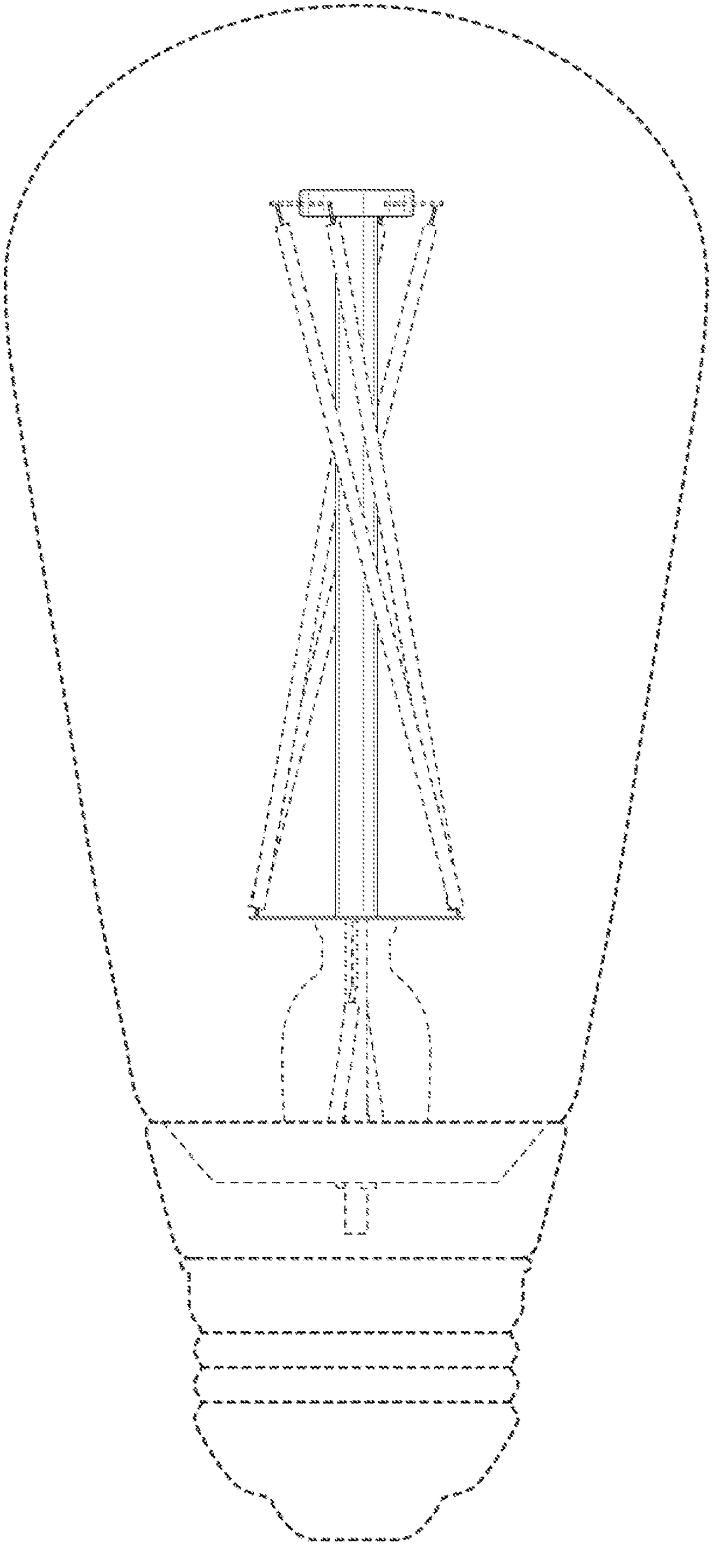
Figure 28:
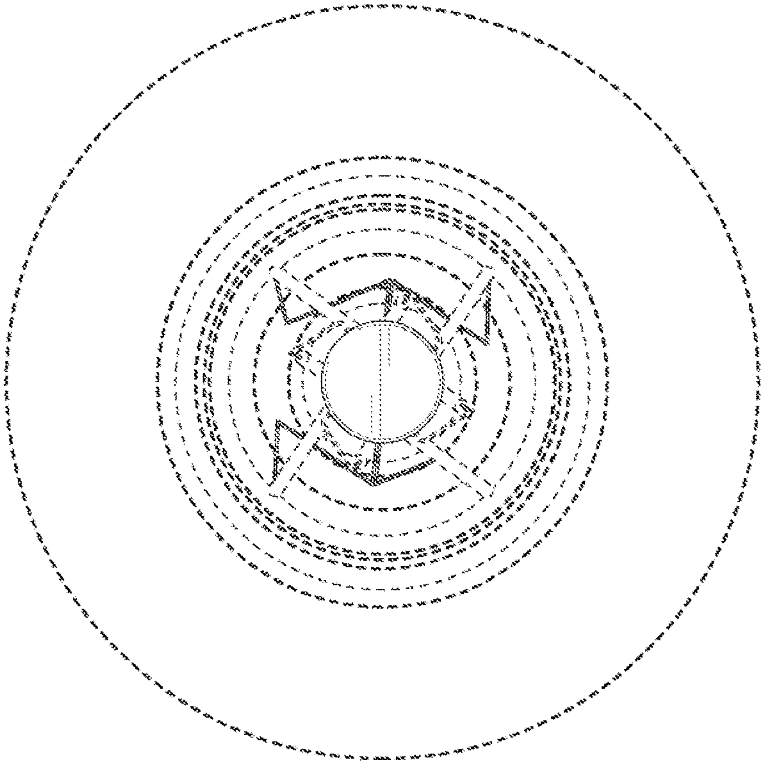
Figure 29:
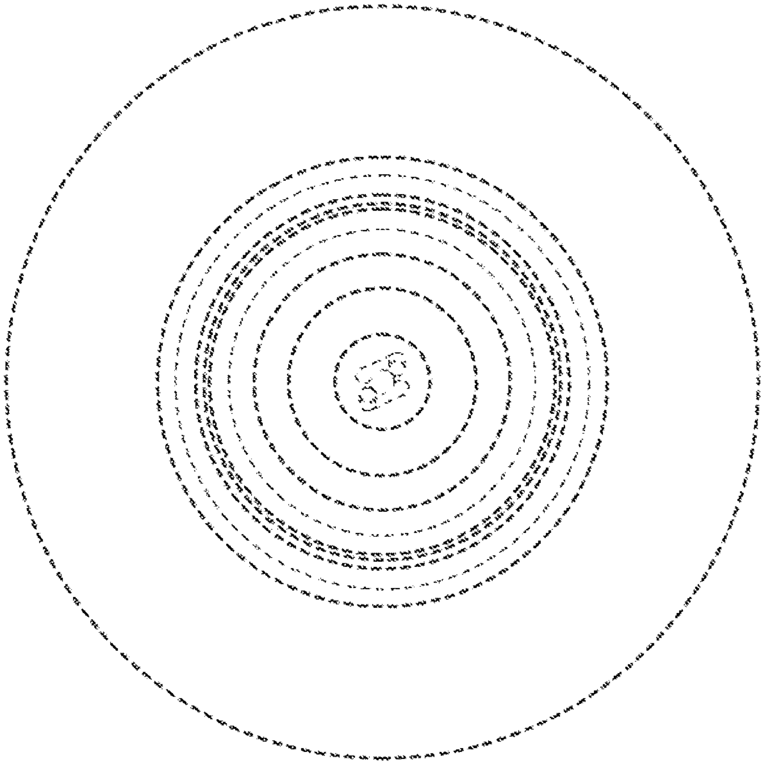

FIG. 8 is an exploded view of an LED lighting device 1 according to one embodiment, illustrating the method of manufacturing the LED light device 1.

As shown therein, the LED driver circuit may be secured within an interior of the base 60. For example, the LED driver circuit 40 may be secured within a nonconductive inner sleeve of the base 60 such that the driver circuitry components mounted to a composite board (e.g., circuit board) are securely disposed within the base 60. The filament tree 150 may be secured (e.g., via an adhesive and/or other fastener) relative to an exposed surface of the LED driver circuit 40, such that the filament tree extends upward away from the base 60.

Conductors secured relative to the lower conductor branches 153*a*, 153*b* may be connected to corresponding connection points of the LED driver circuit 40 (e.g., via soldering) to place the LED filaments 151 of the filament tree 150 in electrical connection with the LED driver circuit 40.

Moreover, the LED driver circuit 40 may be electrically connected to the base 60. For example, one or more connecting wires (not shown) may be electrically connected to electrical contacts of the base 60. For LED lighting devices 1 that do not comprise a base 60, the connecting wires may be electrically connected to other circuitry of the LED lighting device 1, connected to a power supply (e.g., line voltage, batteries, etc.), and/or the like.

Finally, the lamp envelope 70 may be secured to the base 60. The lamp envelope 70 (e.g., embodied as a globe) may be fit over the filament tree 150 and secured to the base 60 such that the filament tree 150 is enclosed within the lamp envelope 70. In various embodiments, the lamp envelope 70 may be snapped onto, threaded onto, glued onto, and/or otherwise secured to the base 60. The filament tree 150 has an overall diameter (e.g., measured across the widest lateral width of the filament tree 150) smaller than a diameter of an open lower end 71 of the lamp envelope 70, such that the filament tree 150 may fit into the lamp envelope 70.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A decorative Light Emitting Diode (LED) bulb providing omnidirectional light output, the bulb comprising:
  - a globe having a bottom end and a top end opposite the bottom end; and
  - a filament tree extending from adjacent the bottom end and comprising a plurality of linear LED filaments, wherein:
    - each of the plurality of linear LED filaments has opposing top and bottom ends, and a twisted arrangement around a support stalk, and each of the plurality of linear LED filaments overlaps a portion of at least two other of the plurality of linear LED filaments when viewed from the top end of the globe.

2. The decorative LED bulb of claim 1, wherein the filament tree has a diameter smaller than a diameter of the bottom end of the globe.

3. The decorative LED bulb of claim 1, wherein each of the linear LED filaments emit light in 360 degrees around the circumference of the LED filament.

4. The decorative LED bulb of claim 1, wherein the top end of each of the plurality of linear LED filaments is positioned a first radial distance from the support stalk and the bottom end of each of the plurality of linear LED filaments is spaced a second radial distance from the support stalk.

5. The decorative LED bulb of claim 4, wherein the second radial distance is equal to the first radial distance.

6. The decorative LED bulb of claim 1, wherein the support stalk is embodied as a clear rod extending away from a support base of the filament tree, wherein the support base is rigidly secured to a connector base secured over the bottom end of the globe.

7. The decorative LED bulb of claim 1, wherein the filament tree further comprises:
lower conductor branches electrically connecting the bottom end of the linear LED filaments with an LED driver circuit; and
upper conductor branches electrically connecting the top end of the linear LED filaments relative to one another.

8. The decorative LED bulb of claim 7, wherein the plurality of linear LED filaments comprises:
a first grouping of linear LED filaments electrically connected via lower conductor branches and upper conductor branches in parallel; and
a second grouping of linear LED filaments electrically connected via lower conductor branches and upper conductor branches in parallel; and
wherein the first grouping of linear LED filaments is electrically connected in series with the second grouping of linear LED filaments via a portion of the upper conductor branches.

9. The decorative LED bulb of claim 7, wherein:
the lower conductor branches comprise a plurality of semi-annular conductor hubs each having a plurality of lower arms extending therefrom, wherein the bottom end of each of the linear LED filaments are electrically connected with a corresponding lower arm of the plurality of lower arms and wherein the semi-annular conductor hubs are electrically insulated from one another and each of the semi-annular conductor hubs are in electrical connection with the LED driver circuit; and
the upper conductor branches comprise an annular conductor hub having a plurality of upper arms extending therefrom, wherein the upper end of each of the linear LED filaments are electrically connected with a corresponding upper arm of the plurality of upper arms.

10. The decorative LED bulb of claim 7, wherein the lower conductor branches and the upper conductor branches have an overall diameter smaller than a diameter of the open bottom end of the globe.

11. The decorative LED bulb of claim 1, wherein a lower end of a first linear LED filament of the plurality of linear LED filaments is vertically aligned with an upper end of a second linear LED filament of the plurality of linear LED filaments in a plane parallel with an axis of the support stalk.

12. The decorative LED bulb of claim 11, wherein the plurality of linear LED filaments further comprises a third linear LED filament positioned between the first linear LED filament and the second linear LED filament.

13. A decorative Light Emitting Diode (LED) bulb providing omnidirectional light output, the bulb comprising:
a globe having a bottom end and a top end opposite the bottom end; and
a filament tree extending from adjacent the bottom end and comprising:
a support stalk defining an upper portion and a lower portion; and
a plurality of LED filaments each having a central portion positioned between two opposing ends, a first of the two opposing ends being attached adjacent the upper portion of the support stalk, a second of the two opposing ends being attached adjacent the lower portion of the support stalk,
wherein each one of the plurality of LED filaments overlaps a portion of at least one other of the plurality of LED filaments when viewed from the upper portion of the support stalk.

14. The decorative LED bulb of claim 13, wherein the filament tree has a diameter smaller than a diameter of the bottom end of the globe.

15. The decorative LED bulb of claim 13, wherein the top end of each of the plurality of linear LED filaments is positioned a first radial distance from the support stalk and the bottom end of each of the plurality of linear LED filaments is spaced a second radial distance from the support stalk.

16. The decorative LED bulb of claim 15, wherein the second radial distance is equal to the first radial distance.

17. The decorative LED bulb of claim 13, wherein the support stalk is embodied as a clear rod extending away from a support base of the filament tree, wherein the support base is rigidly secured to a connector base secured over the bottom end of the globe.

18. The decorative LED bulb of claim 13, wherein the filament tree further comprises:
lower conductor branches electrically connecting the bottom end of the linear LED filaments with an LED driver circuit; and
upper conductor branches electrically connecting the top end of the linear LED filaments relative to one another.

19. The decorative LED bulb of claim 13, wherein a lower end of a first linear LED filament of the plurality of linear LED filaments is vertically aligned with an upper end of a second linear LED filament of the plurality of linear LED filaments in a plane parallel with an axis of the support stalk.

20. The decorative LED bulb of claim 19, wherein the plurality of linear LED filaments further comprises a third linear LED filament positioned between the first linear LED filament and the second linear LED filament.

* * * * *